United States Patent [19]

Nakazawa

[11] Patent Number: 5,212,636
[45] Date of Patent: May 18, 1993

[54] RADIO RECEIVER CAPABLE OF CONFIRMING GAMBLING RESULTS

[75] Inventor: Eiji Nakazawa, Akishima, Japan

[73] Assignee: Casio Computer Co., Ltd., Tokyo, Japan

[21] Appl. No.: 456,852

[22] Filed: Dec. 26, 1989

[30] Foreign Application Priority Data

Dec. 28, 1988 [JP] Japan .......................... 63-171265[U]
Dec. 28, 1988 [JP] Japan .......................... 63-171266[U]
Dec. 28, 1988 [JP] Japan .......................... 63-171267[U]
Dec. 28, 1988 [JP] Japan .......................... 63-171268[U]
Dec. 28, 1988 [JP] Japan .......................... 63-171269[U]
Dec. 28, 1988 [JP] Japan .......................... 63-171270[U]

[51] Int. Cl.⁵ ...................... G06F 15/28; A63B 71/00
[52] U.S. Cl. .................................. 364/412; 273/138 A
[58] Field of Search ............... 364/900, 412, 411; 273/237, 148 R, 138 A, 246, 86 G; 340/323 R; 455/325

[56] References Cited

U.S. PATENT DOCUMENTS 4,624,462 11/1986 Itkis ................................. 273/237
4,692,864 9/1987 Moosz .............................. 364/412
4,875,164 10/1989 Monfort ........................... 364/412

Primary Examiner—Roy N. Envall, Jr.
Assistant Examiner—Khai Tran
Attorney, Agent, or Firm—Frishauf, Holtz, Goodman & Woodward

[57] ABSTRACT

A radio receiver that receives gambling information such as for a horse race and that displays prediction data, payout amount data and odds data. The radio receiver includes an input unit for inputting prediction data on a gambling event; a memory unit for storing the prediction data input by the input unit, a receiving unit for receiving result data representative of a gambling result, a coincidence judging unit for judging a coincidence between the result data received by the receiving unit and the prediction data stored in the memory unit; and an announcing unit for announcing the coincidence between the result data and the prediction data when such coincidence is judged by the coincidence judging unit.

35 Claims, 38 Drawing Sheets

|  | R₁ | R₂ | R₃ | R₄ |  |  | 15 |  |
|---|---|---|---|---|---|---|---|---|
|  | 4 | 1 | 3 | 1 | 0 | 0 | 0 | 0 |
|  | 0 | 0 | C |  |  | P | S | L |
| M₀ | 1-3 |  | 1000 |  |  |  |  |  |
| M₁ | 3-6 |  | 2000 |  |  |  |  |  |
| M₂ | 1-6 |  | 1000 |  |  |  |  |  |
| M₃ | 1-8 |  | 1000 |  |  |  |  |  |
| M₄ | 5-8 |  | 3000 |  |  |  |  |  |
| M₅ | 2-6 |  | 1000 |  |  |  |  |  |
| M₆ | 2-8 |  | 1000 |  |  |  |  |  |
| M₇ | 6-8 |  | 1000 |  |  |  |  |  |
| M₈ | 3-4 |  | 1000 |  |  |  |  |  |

Rows M₀–M₂: FIRST RACE DATA
Rows M₃–M₄: SECOND RACE DATA
Rows M₅–M₇: THIRD RACE DATA
Row M₈: FOURTH RACE DATA Columns: G | H | I | J | K

FIG. 10

|   | D | E | F |   |
|---|---|---|---|---|
| $N_0$ | 1-6 | 750 | 1 | FIRST RACE |
| $N_1$ | 2-8 | 1200 | 1 | SECOND RACE |
| $N_2$ | 2-8 | 850 | 1 | THIRD RACE |
| $N_3$ | 3-5 | 900 | 0 | FOURTH RACE |

|  | R₁ | R₂ | R₃ | R₄ |  | 15 |  |  |
|---|---|---|---|---|---|---|---|---|
|  | 4 | 1 | 3 | 1 | 0 | 0 | 0 | 0 |
|  | 0 | 0 | C |  | P |  | S | L |
| M₀ | 1-3 | | 1000 | | | | 0 | 0 |
| M₁ | 3-6 | | 2000 | | | | 0 | 0 |
| M₂ | 1-6 | | 1000 | | | | 7500 | 1 |
| M₃ | 1-8 | | 1000 | | | | 0 | 0 |
| M₄ | 5-8 | | 3000 | | | | 0 | 0 |
| M₅ | 2-6 | | 1000 | | | | 0 | 0 |
| M₆ | 2-8 | | 1000 | | | | 8500 | 1 |
| M₇ | 6-8 | | 1000 | | | | 0 | 0 |
| M₈ | 3-4 | | 1000 | F F F F F F | | | | 0 |

M = {M₀...M₈}

Braces: M₀–M₂ FIRST RACE DATA; M₃–M₄ SECOND RACE DATA; M₅–M₇ THIRD RACE DATA; M₈ FOURTH RACE DATA Columns: G, H, I, J

FIG. 12

| RACE IDENTIFICATION CODE | SORT OF DATA |
|---|---|
| 0000 | RACE RESULTS (FORECAST) OF ALL RACES AND DIVIDEND AMOUNTS |
| 0001 | RACE RESULTS (WIN) OF ALL RACES AND DIVIDEND AMOUNTS |
| 0010 | RACE RESULTS (PLACE/SHOW) OF ALL RACES AND DIVIDEND AMOUNTS |
| 0011 | DATA ON 1ST. RACE |
| 0100 | DATA ON 2ND. RACE |

FIG.19

| K | S | L | P | | C | | |
|---|---|---|---|---|---|---|---|
| R | | 1R 2-3 | 1800 | 7R 6-8 | 3500 |
| | | 2R 3-6 | 280 | 8R 1-3 | 650 |
| | | ⋮ | ⋮ | ⋮ | ⋮ |
| X | | 1-1 | 111.5 | 4-5 | 6.3 |
| | | 1-2 | 75.3 | 4-6 | 6.8 |
| | | ⋮ | ⋮ | ⋮ | ⋮ |
| Y | | A | 450 | G | 475 |
| | | B | 470 | H | 480 |
| | | ⋮ | ⋮ | ⋮ | ⋮ |
| Z | | A | 0200 | G | 0002 |
| | | B | 1210 | H | 0104 |
| | | ⋮ | ⋮ | ⋮ | ⋮ |

FIG. 20

RESULT KEY (S3)

| | | |
|---|---|---|
| 1R | 2-3 | 1800 |
| 2R | 3-6 | 280 |
| 3R | 4-5 | 950 |
| 4R | 6-6 | 5120 | a

SEARCH KEY (S2)

| | | |
|---|---|---|
| 5R | 7-8 | 950 |
| 6R | 7-8 | 1010 |
| 7R | 6-8 | 3500 |
| 8R | 1-3 | 650 | b

FIG. 25A

WEIGHT KEY (S3)

| | |
|---|---|
| A | 450 |
| B | 470 |
| C | 500 |
| D | 465 | c

FIG. 25B

FRAME DESIGNATION KEY

| | | |
|---|---|---|
| ☐1 | A | 450 |
| HEAVY | | 0020 |
| GOOD | | 1101 |
| NO GOOD | | 0001 |
| 1200 | | 1.13.7 |
| 1600 | | 1.34.5 | d

FIG. 25C

RAM 35

| | K | S | L | P | | D |
|---|---|---|---|---|---|---|
| R | 1R 2-3 | | 1800 | 7R 6-8 | | 3500 |
| | 2R 3-6 | | 280 | 8R 1-3 | | 650 |
| | | | | | | |
| Q1 | A | | 450 | 1200 | | 1.13.6 |
| | 0010 | | 2001 | 1400 | | 1.20.8 |
| | | | | | | |
| Q2 | | | | | | |
| | | | | | | |
| Q3 | | | | | | |

FIG. 28

|  | (FRAME DESIGNATING KEY S6) |  |
|---|---|---|
| ⌈0⌋ ⌈0⌋ | | |
| 1R | 2-3 | 1800 |
| 2R | 3-6 | 280 |
| 3R | 4-5 | 950 |
| 4R | 6-6 | 5120 | a

SEARCH KEY S2

| 5R | 7-8 | 950 |
|---|---|---|
| 6R | 7-8 | 1010 |
| 7R | 6-8 | 3500 |
| 8R | 1-3 | 650 | b

FIG. 32A

DATA SORT DESIGNATING KEY S7

| A | 450 |
|---|---|
| B | 470 |
| C | 500 |
| D | 465 |

FIG. 32B

|  | (FRAME DESIGNATING KEY S6) |  |
|---|---|---|
| ⌈0⌋ ⌈1⌋ | | |
| [1] | A | 450 |
| HEAVY | | 0020 |
| GOOD | | 1101 |
| NO GOOD | | 0001 |
| 1200 | | 1.13.7 |
| 1600 | | 1.34.5 |

FIG. 32C

| IDENTIFICATION CODE | SORT OF DATA | |
|---|---|---|
| | (a=0) | (a=1) |
| 000 | RACING RESULT(EITHER ORDER FORECAST) | DIVIDEND |
| 001 | RACING RESULT(WIN) | DIVIDEND |
| 010 | RACING RESULT(CONNECT ORDER FORECAST) | DIVIDEND |
| 011 | COMBINATION | ODDS |
| 100 | HORSE NAME | HORSE WEIGHT |
| 101 | NAME OF HORSE RACE NEWSPAPER | FORECAST |
| ---- | ---- | ---- |

RADIO RECEIVER CAPABLE OF CONFIRMING GAMBLING RESULTS

BACKGROUND OF THE INVENTION

1. Field of the Invention

The present invention relates to a radio receiver capable of receiving by way of radio waves, gamble results of, for instance, a horse race, a boat race, a motorcycle track race, and lucky number data of a lottery, and resultant data of various wagers.

2. Description of the Related Art

In a horse race, a short-wave broadcast is performed within a race stadium so, as to announce a racing result for persons who bought horse race betting tickets. Thus, in order to listen to this racing result, specific-purpose receivers are available.

However, these conventional specific-purpose receives have the following drawbacks because acoustic information is merely unidirectionally announced therefrom, which is similar to the general-purpose radio receivers. That is, most of an audience may probably fail to hear the racing results. In such a case, the audience must go to a place where the racing results are displayed, which may be difficult for some of the audience. Since the above-described short-wave broadcast cannot reach outside the racing stadium, people can hardly know immediately the racing result unless the general radio or television broadcast announces the racing result. Accordingly, they must know the result from newspapers, telephone information service and the like.

The similar difficulties may occur in case of a lottery and a wager. For instance, when a person wishes to know whether or not the number of the lottery which he bought is equal to the lucky number, he must receive the information by a telephone service, or see a printed publication on which the lucky number has been printed.

Under such a circumstance, it may be conceived that, for instance, various data on the races including the racing results and/or the lucky number data of a lottery are transmitted by radio communication, wherein transmitted data are stored in a memory employed in a radio receiver and also displayed thereon. However, there is no way to confirm whether or not the horse race ticket or lottery which he bought wins if the racing result data are merely received and displayed. To this end, he must identify the numbers of his horse race ticket or lottery with the display contents, which may cause a very cumbersome workload.

Similarly, it may be conceived that not only the race results, but also various data concerning the horse races are transmitted when horse race tickets are bought. However, in this case, since the types of racing data are very large, the radio receiver must employ a memory having a large enough memory capacity capable of handling all of these various data the size of the radio receive thus becomes necessarily large.

SUMMARY OF THE INVENTION

The present invention has been made in an attempt to solve the above-described problems, and therefore has as an object the provision of a radio receiver by which a racing result and lucky numbers of a lottery can be immediately confirmed. It is another object of the present invention to provide a radio receiver by which an easy confirmation can be made whether or not prediction made by a ticket buyer wins.

A further object of the present invention is to provide a radio receiver capable of arbitarily displaying various information concerning races.

To achieve the above-described objects, a radio receiver according to the present invention is characterized by comprising:

input means for inputting prediction data;

memory means for storing the prediction data entered by said input means;

receiver means for receiving resultant data;

coincidence judging means for judging a coincidence between the gamble resultant data received by said receiver means and the prediction data stored in said memory means; and, announcing means for announcing the coincidence when the coincident between said two pieces of data is judged by the coincidence judging means.

In accordance with the radio receiver with the above-described arrangements, the following particular advantages can be achieved. That is, the racing results and/or the lucky numbers of the lottery can be immediately recognized, and furthermore, the prediction on the races and the number of the lottery which are bought can be readily confirmed without any identification. A very useful radio receiver can this be realized.

BRIEF DESCRIPTION OF THE DRAWINGS

For a better understanding of the present invention, reference is made to the following descriptions in conjunction with the accompanying drawings, in which:

FIGS. 1 through 15 represent a radio receiver according to a first preferred embodiment of the present invention;

FIG. 1 is a plan view of the radio receiver according to the first preferred embodiment;

FIG. 2 is a schematic block diagram of a circuit arrangement of the first radio receiver shown in FIG. 1;

FIG. 3 represents a format of a transmission signal employed in the first radio receiver;

FIG. 4 schematically illustrates a memory content of RAM 11 shown in FIG. 2;

FIG. 5 schematically represents a memory content of RAM 15 shown in FIG. 2;

FIG. 6 is a flowchart for illustrating an overall processing operation of the first radio receiver;

FIG. 7 is a flowchart for representing a concrete process of fetching reception data (step a13) shown in FIG. 6;

FIGS. 8 and 9 are flowcharts for representing concrete processes when the read key $S_1$ is operated and also the confirmation key $S_2$ is operated, respectively, in the key process (step a5) shown in FIG. 6;

FIG. 10 illustrates one example case that the prediction data for the respective races are stored in RAM 15;

FIG. 11 illustrates one example case that the reception data are stored in RAM 11;

FIG. 12 illustrates one example case that the refunded amount data for the respective races are stored in RAM 15;

FIG. 13 represents the display changing conditions of the display unit 2 based upon the operations of the read key $S_1$ and confirmation key $S_2$;

FIGS. 14 and 15 represent a radio receiver according to a second preferred embodiment of the present invention;

FIG. 14 is a schematic block diagram for showing a portion of a circuit arrangement with the second radio receiver;

FIG. 15 is a format of a transmission signal employed in the second radio receiver;

FIGS. 16 to 25C represent a radio receiver according to a third preferred embodiment of the present invention;

FIG. 16 is a perspective view of the third radio receiver;

FIG. 17 is a schematic block diagram of the third radio receiver;

FIG. 18 represents a signal format of a transmission signal employed in third radio receiver;

FIG. 19 represents a relationship between the sort of data and the race identification code;

FIG. 20 is a schematic diagram for representing a major content of RAM 35 shown in FIG. 17;

FIG. 21 is a flowchart for representing an overall process operation of the third radio receiver;

FIG. 22 is a flowchart for representing a concrete process of the reception data fetching operation defined in FIG. 21;

FIG. 23 is a flowchart for representing a concrete key process defined in FIG. 21;

FIG. 24 is a flowchart for representing a concrete process when the frame designation key $S_{14}$ is operated during other key processes defined in FIG. 23;

FIGS. 25A to 25C illustrate the display changing conditions of the display unit 2 effected by the key operation;

FIGS. 26 to 32C represent a radio receiver according to a fourth preferred embodiment of the present invention;

FIG. 26 is a perspective view of the fourth radio receiver;

FIG. 27 is a format of a transmission signal employed in the fourth radio receiver;

FIG. 28 is a schematic diagram for showing a major content of RAM 35 employed in the fourth radio receiver;

FIGS. 29 to 31 are concrete flowcharts for representing a process for fetching the reception data; a process for an overall key operation; and a key process when the data sort designation key $S_{17}$ is operated;

FIGS. 32 to 32C represent the display changing conditions of the display unit 2 effected by the key operation of the fourth radio receiver;

FIGS. 34 to 40B represent a radio receiver according to a sixth preferred embodiment of the present invention;

FIG. 34 is a perspective view of the sixth radio receiver;

FIG. 35 represents a signal format of a transmission signal employed in the sixth radio receiver;

FIG. 36 represents a relationship between the sort of data and/the race identification code;

FIG. 37 is a schematic diagram for representing a major content of RAM employed in the sixth radio receiver;

FIG. 38 is a flowchart for representing a concrete process of the reception data fetching operation employed in the sixth preferred embodiment;

FIG. 39 is a flowchart for representing a concrete key process employed in the sixth preferred embodiment; and, FIGS. 40A and 40B represent the display changing conditions effected during either the key operation, or data reception.

DETAILED DESCRIPTION OF THE PREFERRED EMBODIMENTS

General Description of First Radio Receiver

Figure 1:
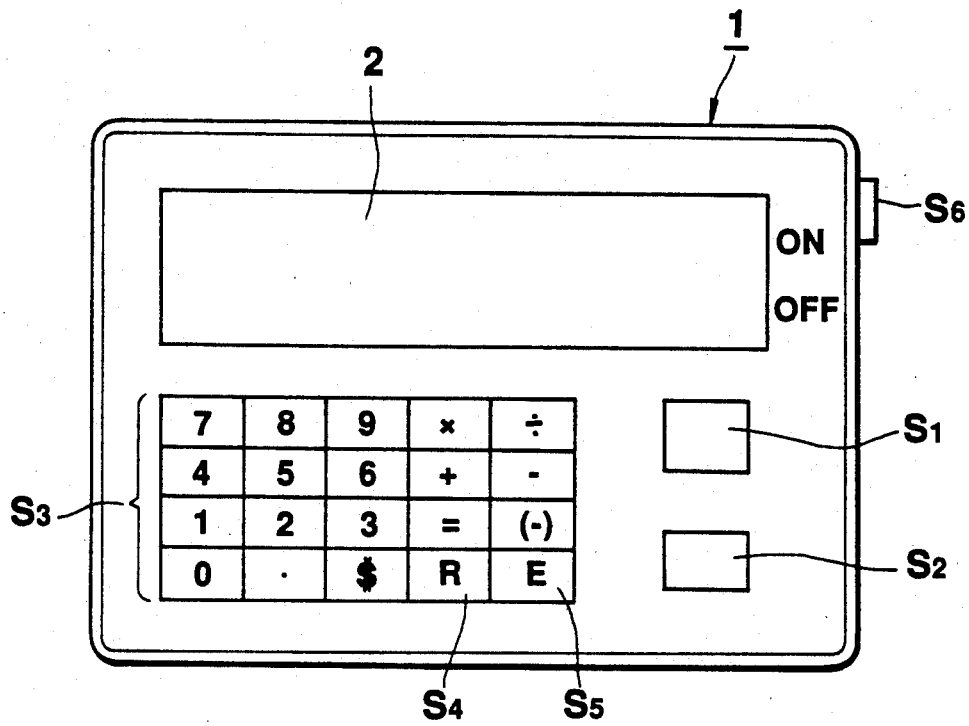

In FIG. 1 there is shown a plan view of a radio receiver according to a first preferred embodiment of the present invention. It should be noted that the radio receiver according to the first preferred embodiment is lent to a certain person within a horse racing stadium, and can receiver the racing resultant data which have been transmitted from a predetermined transmission station located within the horse racing stadium.

As shown in FIG. 1, a display unit 2 constructed of a liquid crystal display apparatus or the like for displaying prediction data, win data of a race is arranged above a front unit of a radio receiver body 1. Then, below the display unit 2, various keys "$S_1$" to "$S_5$" are arranged. The key "$S_1$" is a read key for selecting the prediction data of the race and the amount data of ticket fee for the respective races which have been stored so as to be displayed on the display unit 2. The key "S" is a confirmation key for displaying the refund amount when the prediction data wins the race. The key "$S_3$" is a data input key for entering the various data on the prediction data and ticket fee. This key "$S_3$" is constructed of number entry keys "0" to "9", a dollar key "$", hyphen key (−), and arithmetic function keys "X", "−", "+", "−" and "=". The key "$S_4$" a race designating key for designating which race is preferable when the prediction data and ticket fee are input. The key "$S_5$" is an entry key for storing the data which have been input by the above keys "$S_3$" and "$S_4$". For instance, when as prediction data on a first race, a combination of "1-5" for a correct order/either order forecast, and a ticket fee "1,000 dollars" are entered, the following key operations are preformed in this order "1", "$S_4$", "1"; "(−)", "5"; "$"; "1"; "0"; "0"; "0"; and "$S_5$". A power switch "$S_6$" is provided on the side portion of the radio receiver body 1 so as to turn ON/OFF the supply of the power to the circuit arrangement only for the receiving operation.

Circuit Arrangement of Radio Receiver

Figure 2:
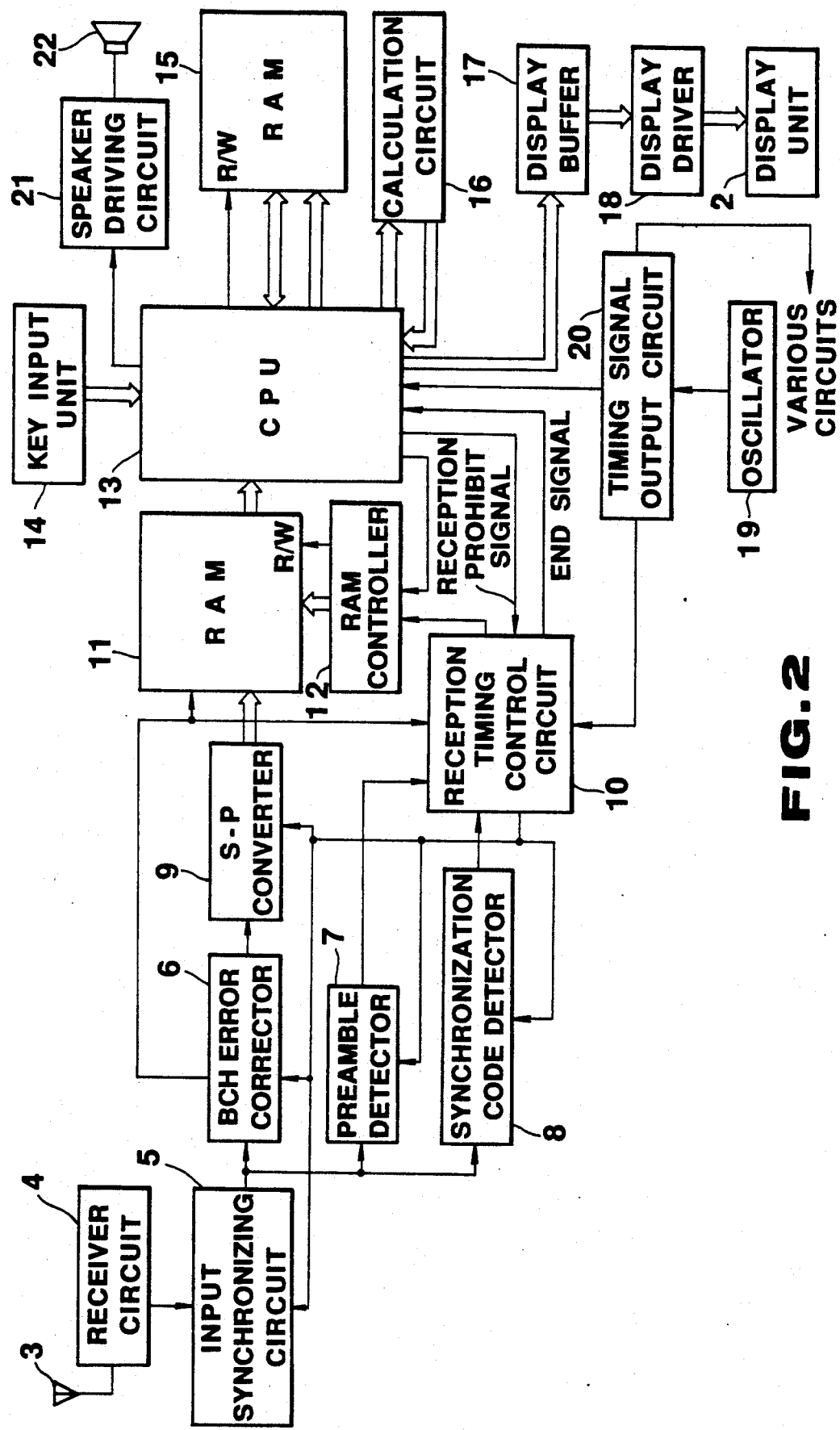

Referring now to FIG. 2, an entire circuit of the radio receiver body 1 according to a first preferred embodiment.

An antenna 3 is employed to receive a radio signal for announcing a racing result transmitted from a predetermined transmission station located within a horse racing stadium. A receiver circuit 4 detects the reception signal from the antenna 3 and further amplifies and demodulates the detected signal into serial data comprising "0" bits and "1" bits.

Figure 3:
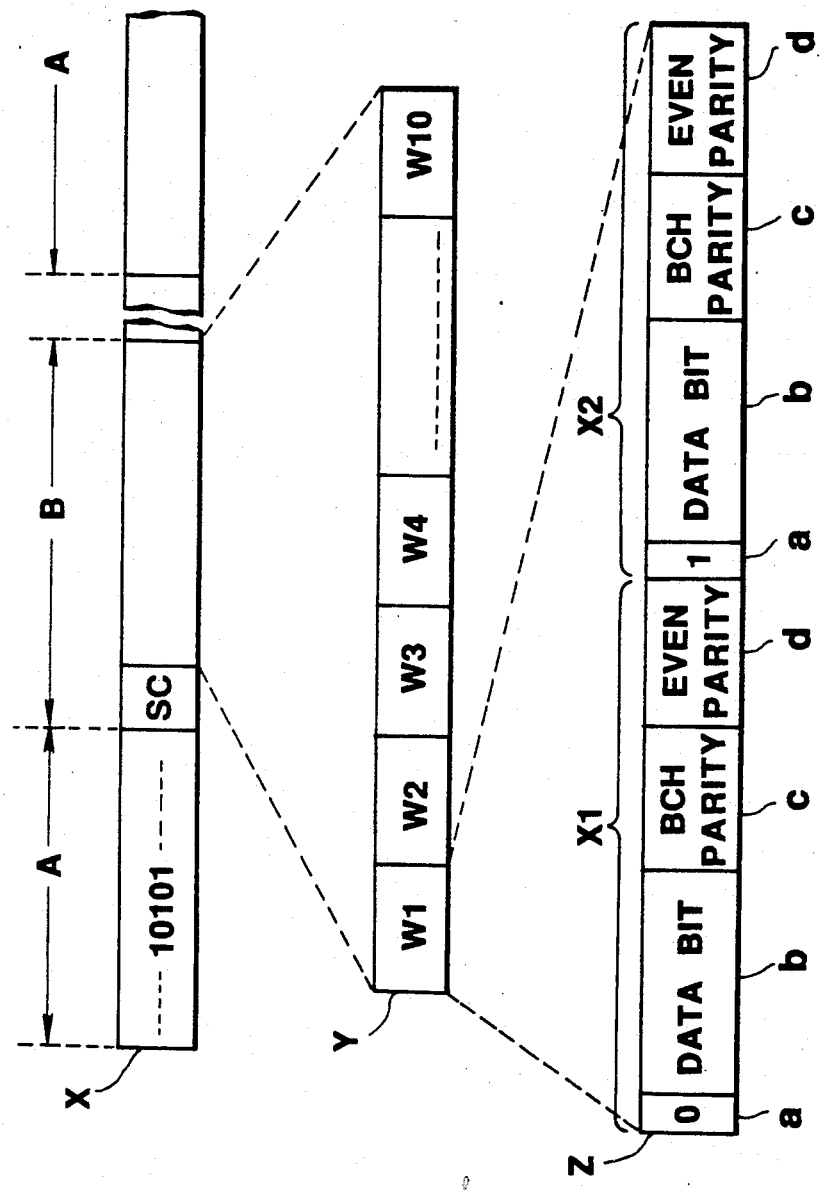

The format of the transmission signal from the transmission station is arranged as, for instance, shown in FIG. 3. First, a preamble signal "A" constructed of repeated "1" and "0" data. Subsequently, a batch signal "B" is sent. The function of this preamble signal "A" is to cause the radio receiver to recognize that the data will be sent and also to establish an input synchronization, The batch signal "B" is arranged by a synchronization code SC at a head position, and also 10 (ten) codes "$W_1$" to "$W_{10}$" corresponding to resultant data from a first race to a tenth race, as represented by "Y" in FIG. 3. Each of these codes "$W_1$" to "$W_{10}$" is arranged by a code word "$X_1$" representative of a racing result (e.g., connect order/either order forecast "1-6") and another code word "$X_2$" indicative of a refund amount. Then, these two code words are arranged by an identification flag "a", a data bit "b", a BCH parity and an even parity. It should be noted that the identification flag "a" is to discriminate the subsequent data bit "b" representative of the racing result data from another data bit indicative of the refund amount data. If this data bit indicates "0", this data indicates racing result data. If this data bit indicates "1", this data indicates refund amount data. The function of the BCH parity "c" is to detect and correct an error occurring in the code. The even parity "d" has the function to represent whether a total amount of the bits indicating "1" from the head bit to the end bit corresponds to an even, number, or an odd number. As a result, a judgement can be made us to whether or not the bit is dropped or added by checking this even parity "d".

Referring back to FIG. 2, an input synchronizing circuit 5 is employed to synchronize the signal output from the receiver circuit 4 with an internal clock. Thus, the signal synchronized in the input synchronizing circuit 5 is supplied to a BCH error correcting circuit 6, a preamble detecting circuit 7, and a synchronization code detecting circuit 8. The BCH error correcting circuit 6 detects and corrects an error in the reception signal based upon a BCH parity "c" shown in FIG. 3. The detailed operation of this BCH error correcting circuit 6 is as follows. If the number of the error bits contained in the identification flag "a" through the BCH parity "c" is smaller than a predetermined number, the error bit data is corrected to normal data. If the number of the error bits is larger than a predetermined number, or there is an error in the even parity "d", a judgement is made that there is an error. The function of the preamble detecting circuit 7 is to detect a preamble signal "A" as represented in FIG. 3. The synchronization code detecting circuit 8 is a circuit for detecting a synchronization code SC shown in FIG. 3 from the received signal. An P-S converting circuit 9 converts the serial digital signal, the error of which has been corrected by the BCH error correcting circuit 6, into parallel data. A reception timing control circuit 10 has the following function. That is, in response to the various detecting signals derived from the preamble detecting circuit 7 and synchronization code detecting circuit 8, an instruction signal to write the received data into RAM 11 is sent to a RAM control circuit 12. Also when the writing operation of the received data to RAM 11 has been accomplished, an end signal is transferred to CPU 13 (will be discussed later). Moreover, only when a reception prohibit signal is being output from CPU 13, the operations of the respective circuits 5 to 9 at the reception side are prohibited.

Figure 4:
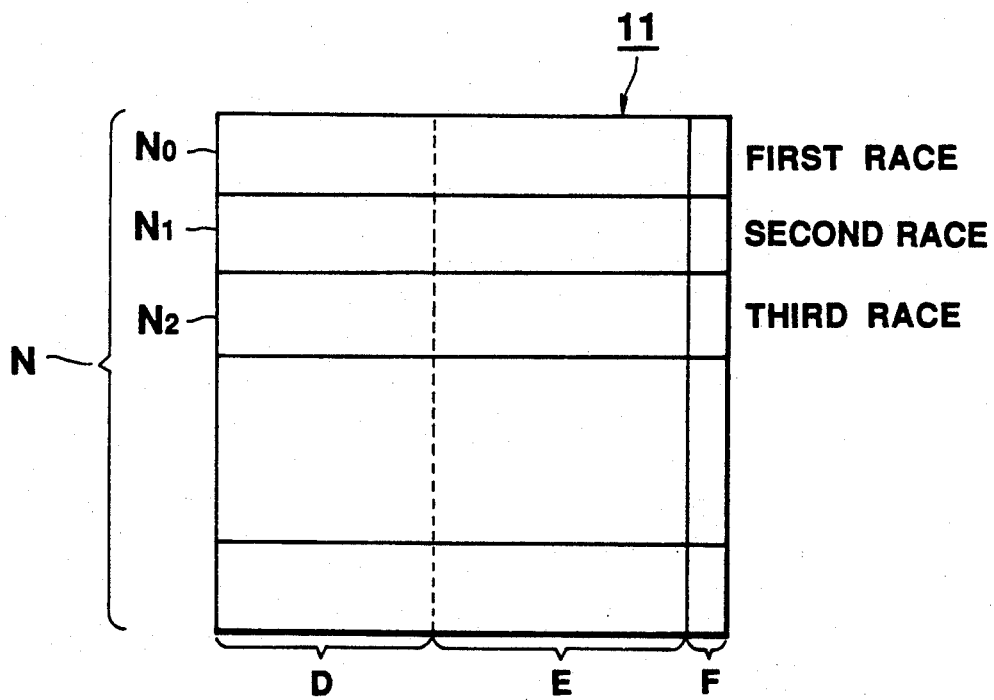

RAM 11 is a readable/writable memory for storing the parallel reception data sent from the S-P converting circuit 9. An internal arrangement of this memory 11 is represented in FIG. 4. In FIG. 4, a reception data register "N" is constructed of a plurality of memory regions $N_0$, $N_1$, $N_2$,—for storing the reception data corresponding to the respective races. Each of these memory regions is arranged by a result data memory unit "D" for storing race result data; a refund data memory region "E" for storing refund amount data; and a nonerror flag "F" for storing whether or not an error is contained in these data. When the BCH error correcting circuit 6 shown in FIG. 2 judges that no error is present base upon the BCH parity "c" and even parity "d" and the like shown in FIG. 3, "1" is stored as the nonerror flag "F". Conversely, when the BCH error correcting circuit 6 judges an error, "0" is stored as the non-error flag "F".

Again, referring back to FIG. 2, in response to instructions sent from CPU 13 and reception timing control circuit 10, RAM control unit 12 gives data write/read instruction signals to RAM 11, and also address data for designates addresses of RAM 11 when the write and read operations are carried out. In CPU 13, a microprogram has been stored in an internal circuit thereof. CPU 13 performs various processes in response to the key input signals derived from the key input unit 14 including the keys "$S_1$" to "$S_5$" shown in FIG. 1, and the end signal output from the reception timing control circuit 10. As these processes effected by CPU 13, for instance, race prediction data which have been input by the key input unit 14 are stored in RAM 15 (will be discussed later), a judgement is made whether or not the race prediction data is coincident with the race result data which has been stored in RAM 11 and fetched into CPU 13, and the display conditions of the display unit 2 is varied based upon the judgement result.

Figure 5:
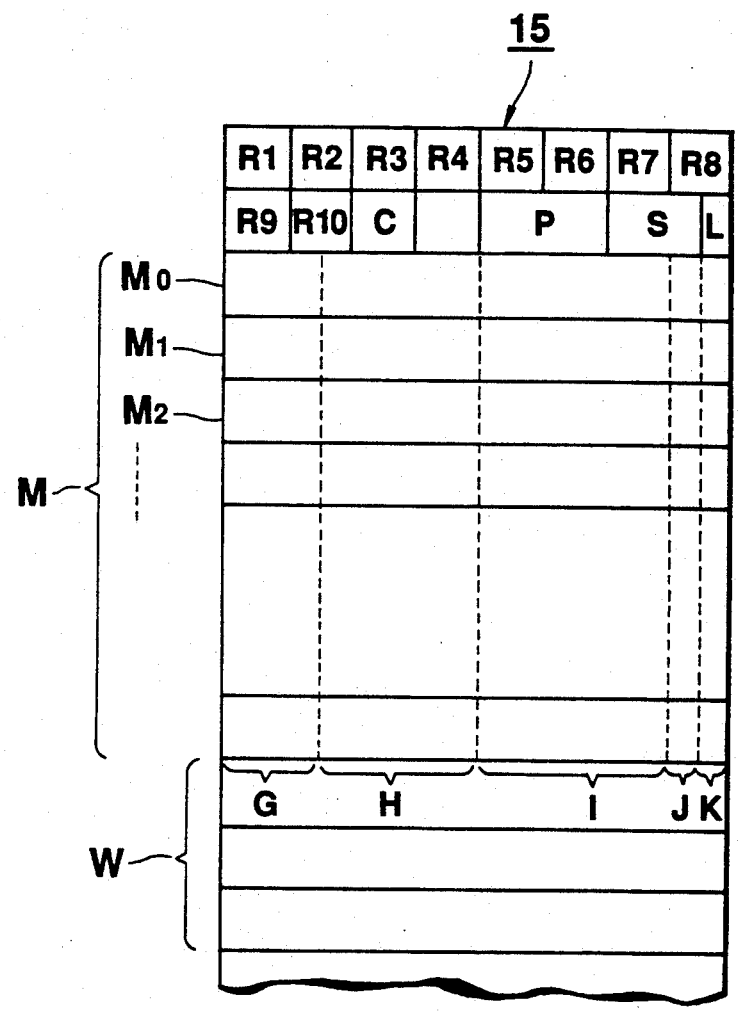

RAM 15 is a readable/writable memory for storing in response to the instruction given from CPU 13, and has a construction as shown in FIG. 5. In FIG. 5, a prediction data register "M" is arranged by a plurality of memory regions "$M_0$", "$M_1$", "$M_2$", —for storing prediction data (not only single data, but also plural data) of the respective races, and ticket price data in a predetermined sequence from a first race. Each of these memory regions is constructed of: a prediction data memory unit "G" for storing the prediction data; a ticket price memory unit "H" for storing ticket price data; a payout amount memory unit "I" for storing the payout amount data in case that the prediction is correct (namely the prediction data is coincident with the received result data; an announcing end flag "J" for storing "1" when announcement is made that the predicted winner has won; and, a winning flag "K" for storing "1" when the predicted winner wins the race.

Prediction-data quantity registers "$R_1$" to "$R_{10}$" correspond to a first race to a tenth race, and are registers for storing a quantity of prediction data per each race. This prediction-data quantity is set by such a fact how many times the entry key "$S_5$" is operated with respect to the race designated by the race key "$S_4$" when the prediction data is input. A race designation register "C" is such a register for designating one race from the first race to tenth race under the processing operation by CPU 13 (will be discussed later). A display pointer "P" has a function to point out data to be displayed on the display unit 2 among a plurality of data which have been stored into the memory regions $M_0$, $M_1$, $M_2$ —, of the above-described prediction data register M. A timer register "S" is a timer used as, instance, a 10-second timer from which the above-described reception prohibit signal (see FIG. 2) is output for 10 seconds when the key is operated. A reception accept/prohibit flag register "L" corresponds to a register for storing "1" when the key is operated, and "0" when the timer register "S" times up. While "1" has been stored in this reception accept/prohibit flag register "L", the reception prohibit signal is output so as to prohibit the reception. A working register "W" is such a register for temporarily storing the data, and utilized for the various processing operations.

Then, referring back to the circuit block diagram of FIG. 2, a calculation circuit 16 calculates the payout amount of the won race based on the ticket fee and the dividend in response to an instruction supplied from CPU 13, and also calculates a total amount from a sum of the ticket fees bought for all races and another sum of the refound amounts. A display buffer 17 corresponds to a memory for storing display pattern data supplied from CPU 13. A display driver 18 is a circuit for displaying the data stored in the display buffer 17 on the display unit 2 (identical to the display unit shown in FIG. 1). An oscillator 19 is a circuit for outputting a reference clock signal having a predetermined time period. A timing signal output circuit 20 corresponds to such a circuit for frequency-dividing the above-described reference clock signal into a predetermined frequency, and for outputting a timing signal so as to control various circuits, e.g., the reception timing control circuit 10, and CPU 13. A speaker drive circuit 21 is a circuit for driving a speaker 22 in response to an initialization signal from CPU 13 when the predicted winner wins the race, whereby a buzzer sound and/or a melody is produced for a predetermined time period or a predetermined time.

Major Processing Operations of First Radio Receiver

Figure 6:
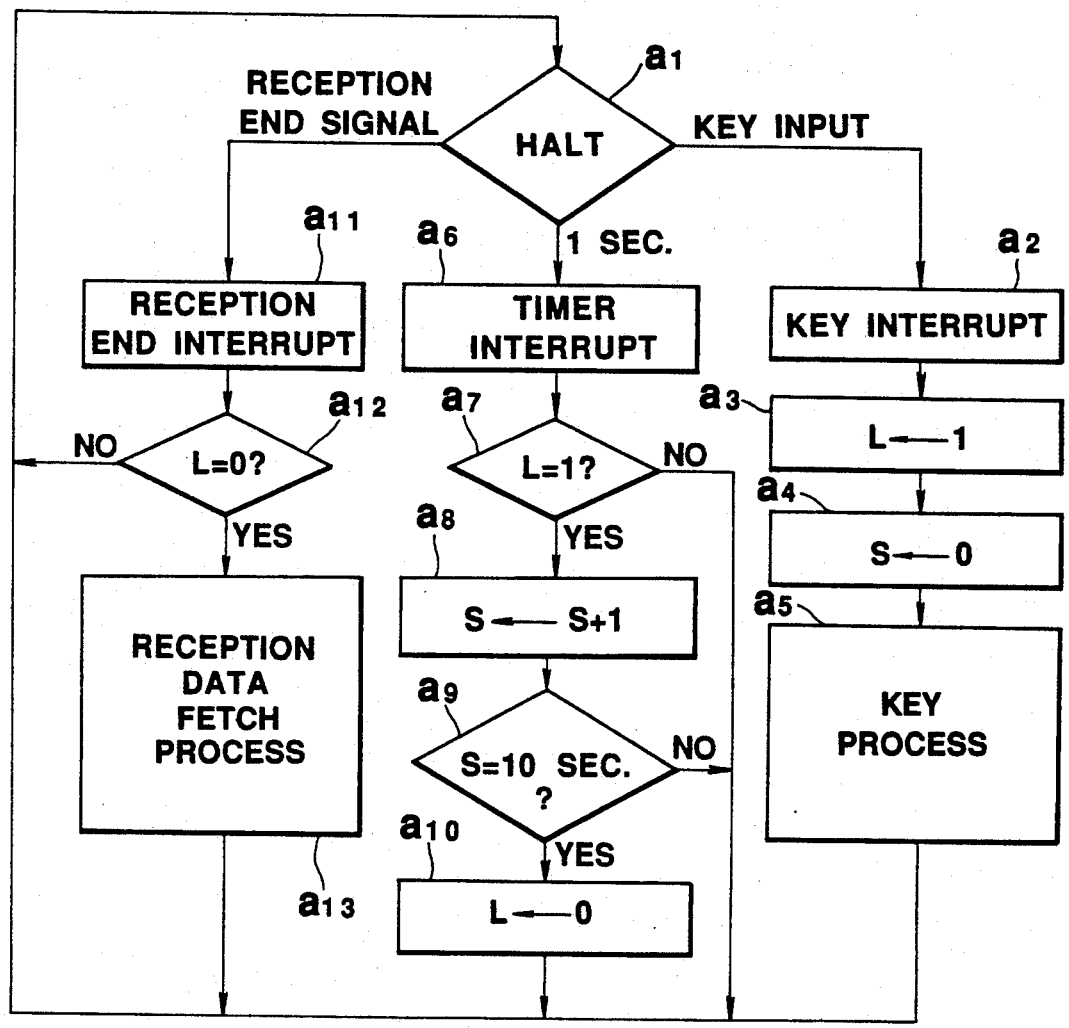
Figure 7:
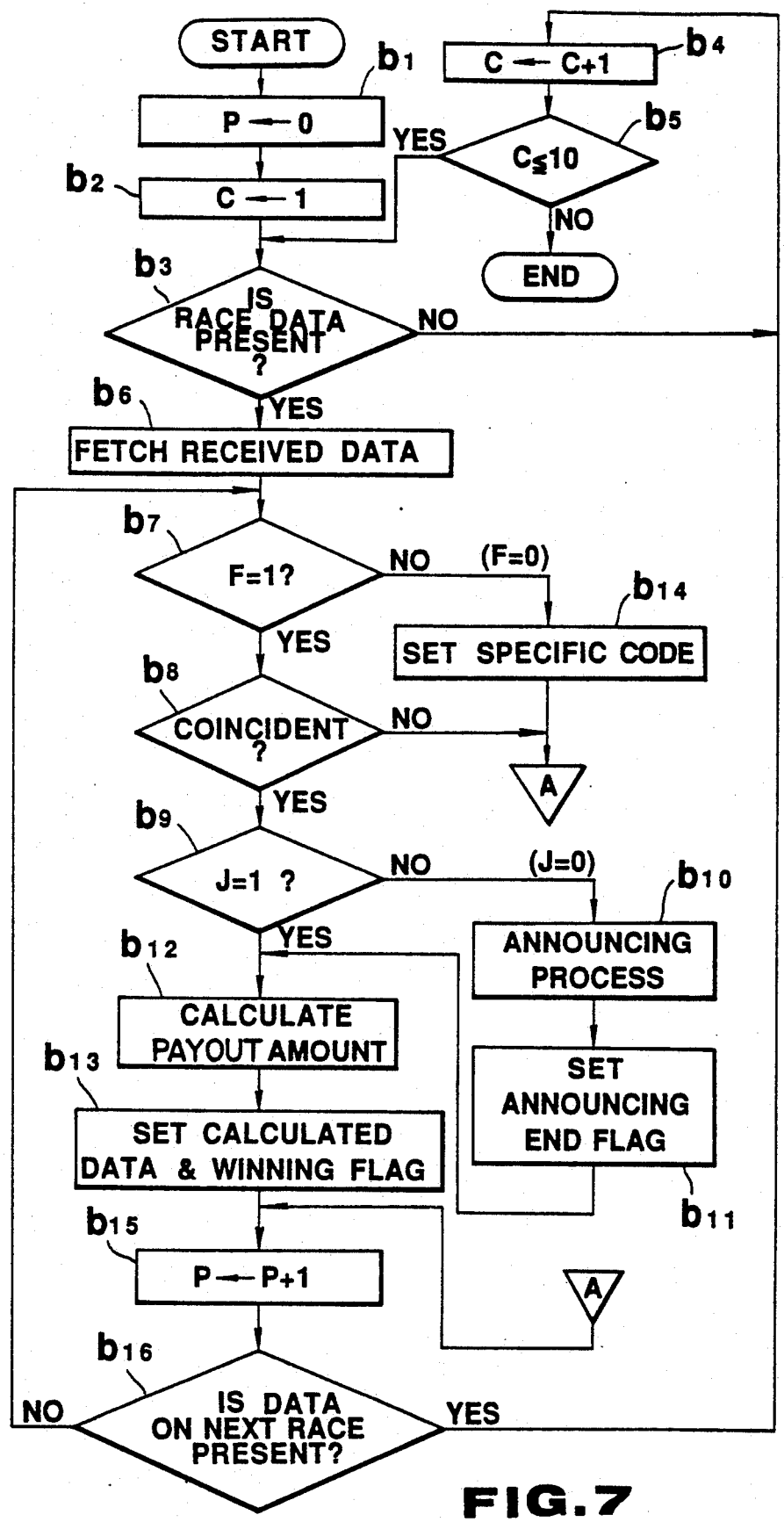
Figure 8:
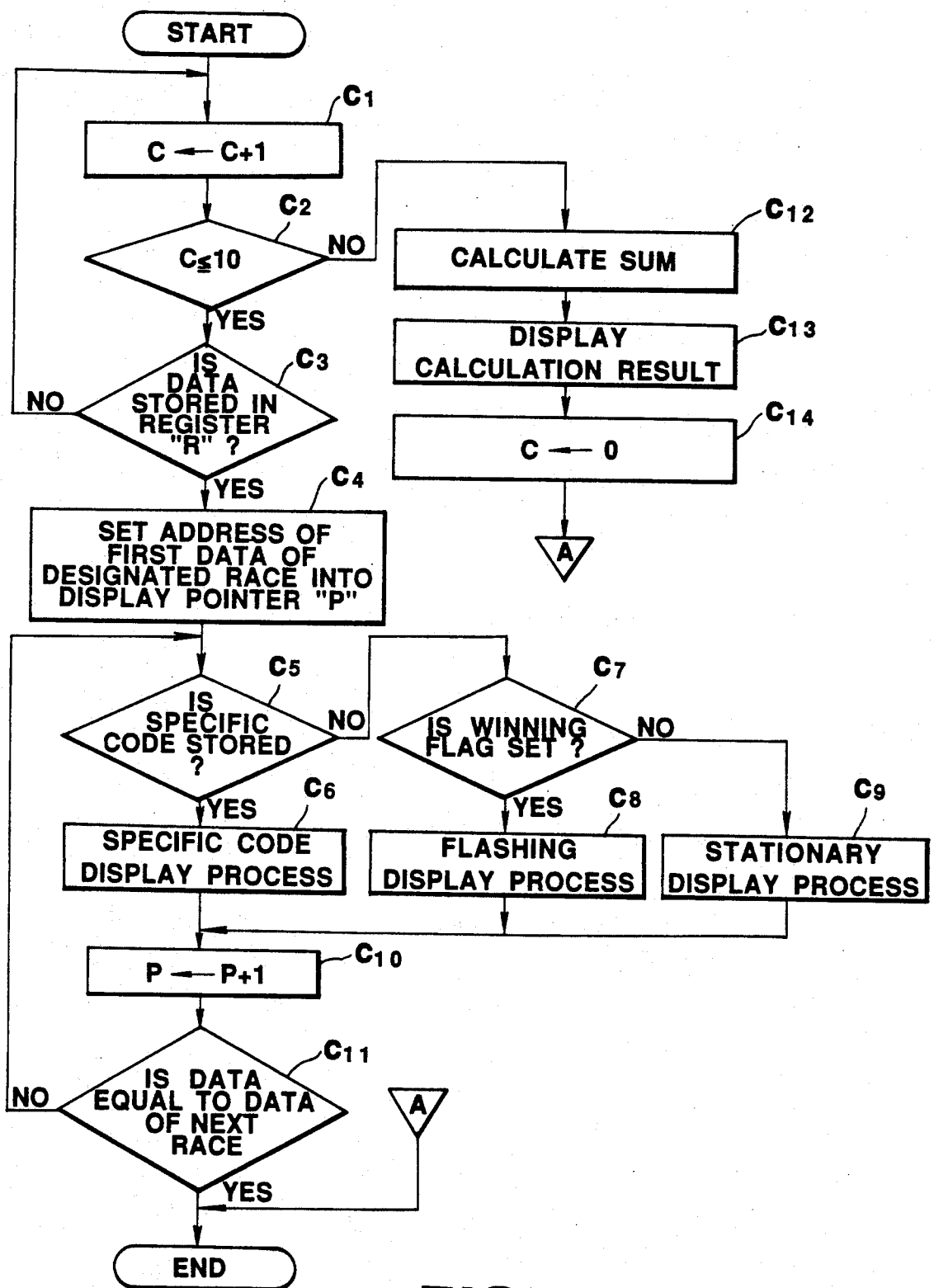
Figure 9:
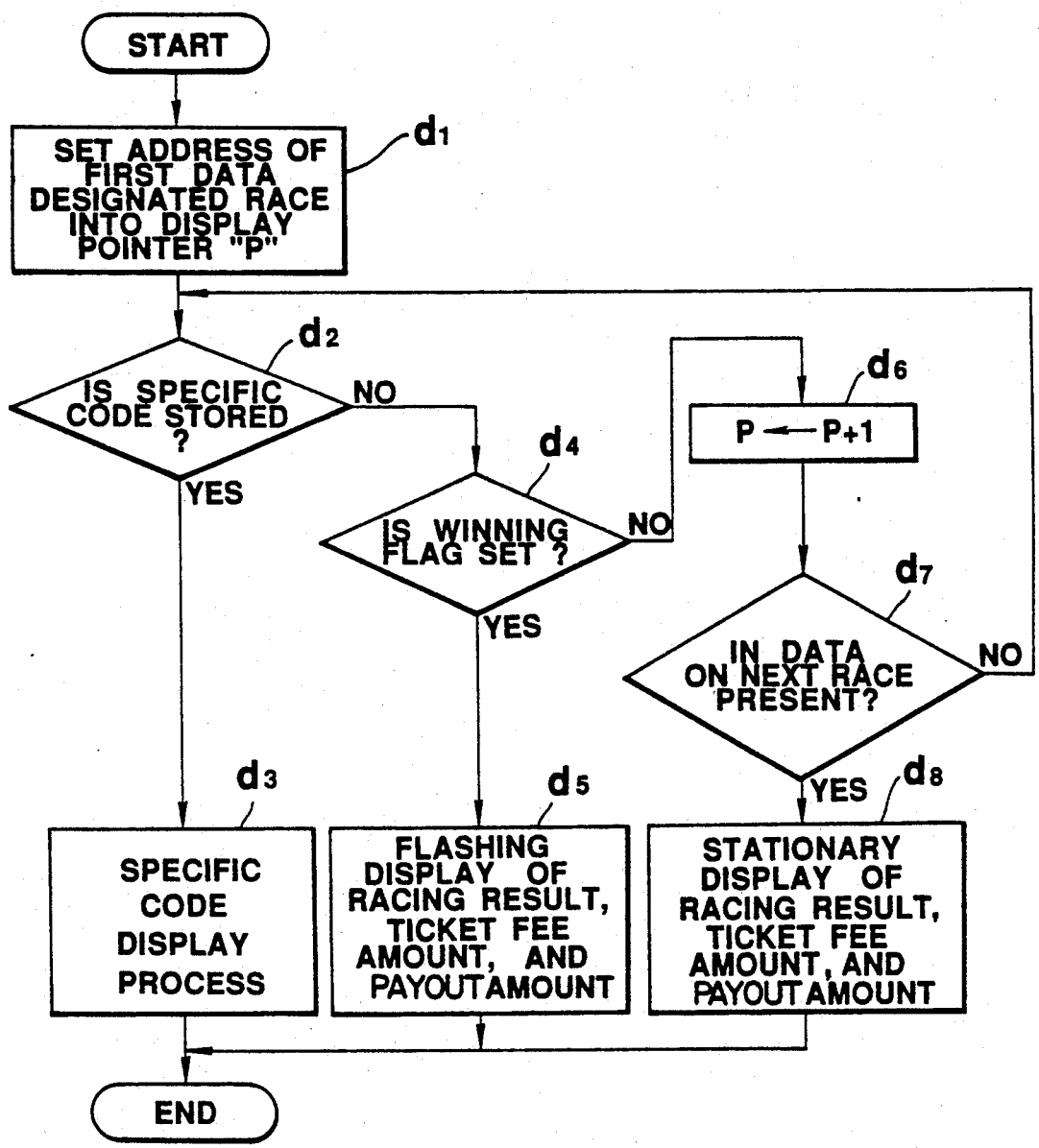
Figures 11, 14:
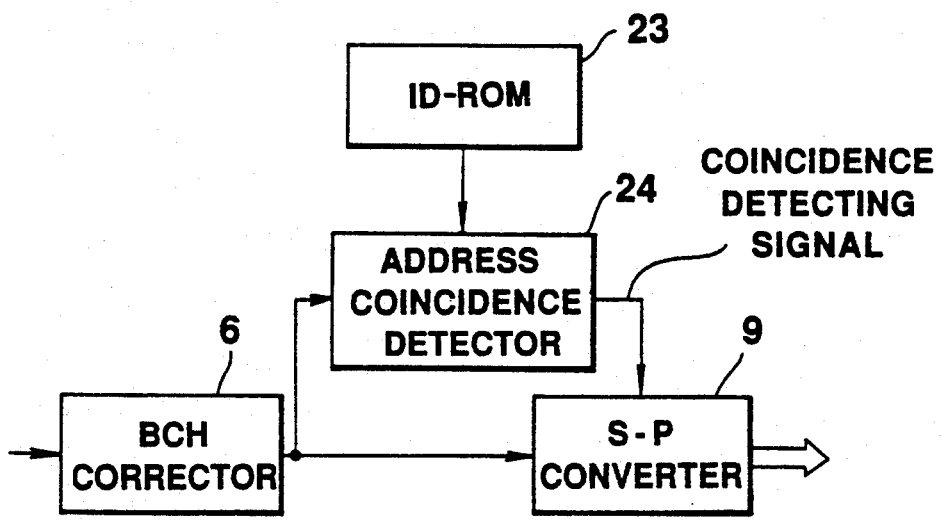
Figure 13:
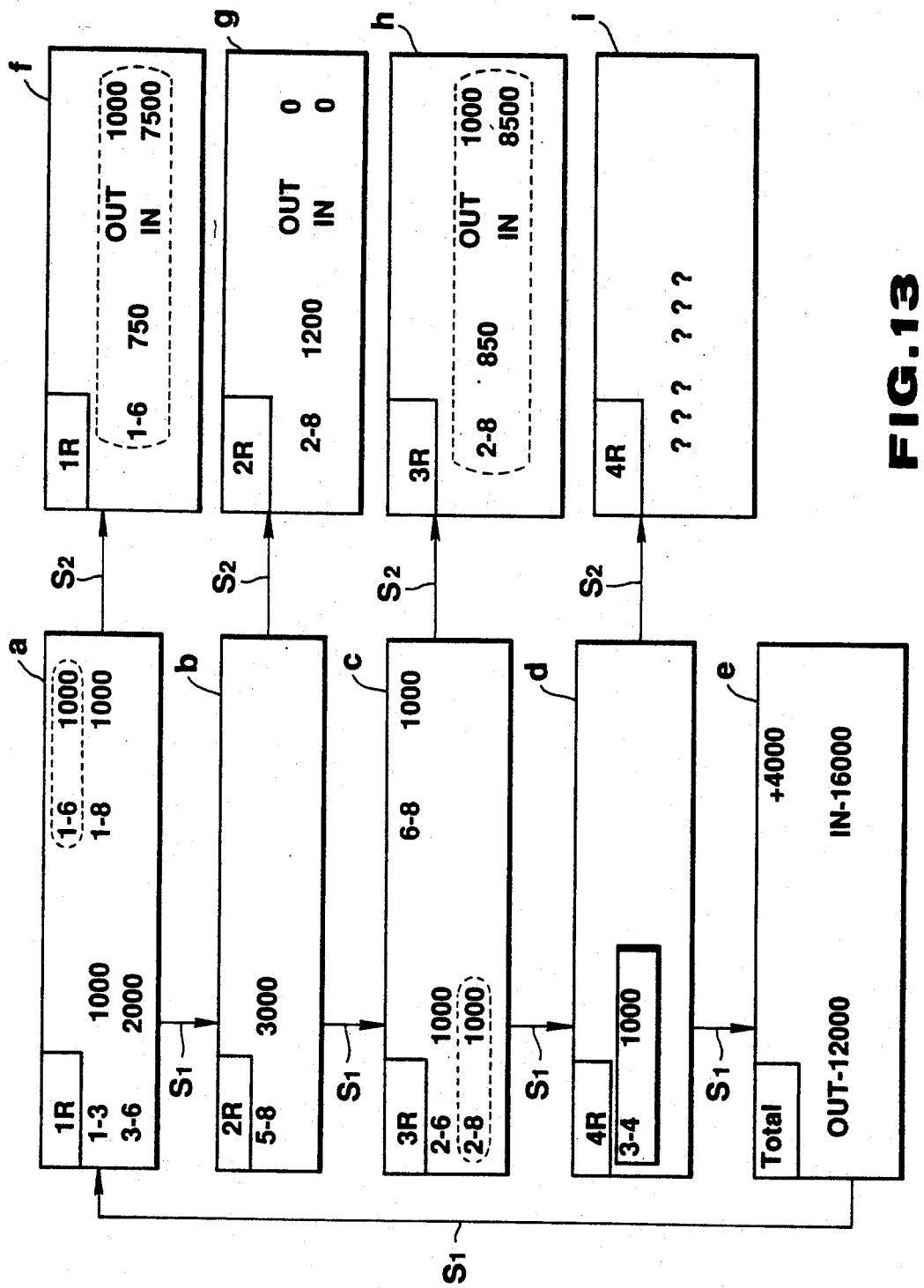

Referring to FIGS. 6 to 13, major processing operations of the radio receiver according to the first preferred embodiment will now be described. FIG. 6 is a flowchart for explaining an overall processing operation of the first preferred embodiment shown in FIG. 6. FIG. 7 is a flowchart for explaining a concrete process for fetching the reception data defined in FIG. 6. FIGS. 8 and 9 are flowcharts for explaining detailed processes when the readout key "S$_1$" is operated, and also the confirmation key "S$_2$" is operated in the key process (step a$_5$) shown in FIG. 6. FIG. 10 is an illustration of one example where the prediction data of the respective races are stored in the prediction data RAM 15. FIG. 11 is an illustration of one example where the reception data are stored in the reception data RAM 11. FIG. 12 is an illustration of one example where the payout amount data for the respective races are stored in the prediction data RAM 15. FIG. 13 illustrates the changing operations of the display conditions of the display unit 2 when the readout key "S$_1$" and confirmation key "S$_2$" are operation.

In the overall operation defined in the flowchart shown in FIG. 6, the process is under a halt condition in a normal condition (step a$_1$). In case that a key input signal is transferred by operating any key, the process is advanced to a key interrupting process (a step a$_2$). In the next step a$_3$, "1" is set to the reception accept/prohibit flag register "L" of RAM 15. As a result, the reception prohibit signal is sent from CPU 13 to the reception timing control circuit 10 as shown in FIG. 2, so that the various operations of the receiver side are prohibited. Thereafter, at a step a$_4$, the timer register "S" is cleared. The key process depending upon the above-described key operation is performed at the next step a$_5$. In this key process, a predetermined key processing operation corresponding to such a case that any of the keys "S$_1$" to "S$_5$" shown in FIG. 5 is operated is carried out. For instance, in case that as previously described, a series of key operations of the race key "S$_4$", data input key "S$_3$", and entry key "S$_5$" are performed, the prediction data (for example, "1-3") and ticket fee data (e.g., 1,000 dollars) with respect to each of the races are sequentially stored in the prediction data register "M" of RAM 15 from the first race to the last race, as represented in FIG. 10. In the example shown in FIG. 10, the prediction data: 4 pieces; 1 pieces; 3 pieces; 1 piece have been stored with respect to the first to fourth races, respectively. It should be noted that in this case, the quantity of the prediction data for the respective races is stored in the prediction data number registers "R$_1$" to "R$_{10}$". As to the key processing operations when the readout key S$_1$ and confirmation key "S$_2$" are operated, a description will be made with reference to FIGS. 8 and 9.

When, on the other hand, the timer signal, e.g., every 1 second, is output in the above-described hault condition (step a$_1$), the process is advanced to a timer interrupt process at a step a$_6$. In the next step a$_4$, a judgement is made whether or not "1" has been stored into the reception accept/prohibit flag register "L". In other words, a judgement is made whether or not the reception prohibit signal is output by operating the key. If L=1, then the timer register "S" is counted up by 1 at the subsequent step "a$_8$". Thereafter, another judgement is made whether or not the content of the timer register "S" becomes "1". Since the content of this timer register "S" becomes "1". Since the content of this timer register "S" is cleared during the key interrupt operation at a step a$_4$, the counting operation begins from zero and then is continued until the content thereof is equal to 10 seconds. When the content of the timer register "S" becomes 10 seconds, "0" is set into the reception accept/prohibit flag register "L" at a step a$_{10}$, so that the reception prohibit signal is released. As a consequence, even when any keys are operated, the reception operation is prohibited for 10 seconds after this key operation. For instance, the above-described input of the prediction data is carried out by sequentially operating a plurality of keys. To prevent the reception interrupt operation while operating various keys, the next key operation is performed within 10 seconds.

As previously described, after 10 seconds have passed since the key was operated, the reception prohibit signal is released so that the signal reception is available. The received data are sequentially stored in the received data register "N" of the received data storage RAM 11 in the order of the first race to the last race, as represented in, for instance, FIG. 11. In FIG. 11, the received data concerning the first, second, third and fourth races are stored in the memory regions N$_0$, N$_1$, N$_2$, N$_3$, respectively. In the resultant data memory unit "D" of the respective memory unit "D" of the respective memory regions, the resultant data (for instance, "1-6" and so on) of the race is stored. In the dividend data memory E of the memory regions, the dividend amount data (e.g. "750" and so on) per 100 dollars is stored. Also, in the no error flag "F", the error check data (if the data contains no error, "1" is stored; conversely if it contains an error, "0" is stored) is stored. When the storage operation of the received data to RAM 11 has been accomplished, the reception end signal is sent from the reception timing control circuit 10 to CPU 13, as illustrated in FIG. 2. Under the above-described hault condition (at the step a$_1$), if this reception end signal is set, a reception end interrupt process is performed (step a$_{11}$). Subsequently, a judgement is made whether or not "0" has been stored into the reception accept/interrupt flag register "L". That is to say, a judgement is made whether or not the reception prohibit signal has been released after more than 10 seconds have elapsed since the key was operated at a step $a_{12}$. If $L=0$, then the process is advanced to a reception data fetch process at the next step $a_{13}$.

Reception Data Fetch Process

Referring now to FIG. 7, a detailed process on the reception data fetch operation will be described.

In the flowchart shown in FIG. 7, "0" is set to a display pointer "P" of RAM 15 at a step $b_1$ so as to designate the data which has been stored in the first memory region "$M_0$" of the prediction data register "M". In the next step $b_2$, "1" is set to the rase designation register "C", whereby the first race can be designated. Thereafter, a judgement is made whether or not the data has been stored in the register corresponding to the race, among the prediction data number registers "$R_1$" to "$R_{10}$", which is designated in the above register "C" (for instance, if $C=1$, then the register $R_1$ corresponding to the first race is designated). Conversely, if no data has been stored in this register, the process is advanced to the next step $b_4$, in which the content of the race designation register "C" is counted up by "1". In the subsequent step $b_5$, a judgement is made whether or not the content of the race designation register "C" is less than 10. In other words, a judgement is made whether or not any one of the races from the first to tenth races has been designated. If the content of this register "C" is larger than 10, a further process is completed. Conversely, if the content of this register "C" is smaller than, or equal to 10, then the process is returned to the previous step $b_3$. That is, in accordance with the above-described steps $b_3$ to $b_5$, a check is made whether or not thee is a race to which the prediction data has been designated, among the first to tenth races.

In the above-described step $b_3$, if there exists the data in the prediction data quantity register corresponding to the race which has been designated by the register "C", the received data (result data, dividend data, and error check data) corresponding to the race designated by the above register "C" are fetched from the received data storage RAM 11 (see FIG. 11). Then, in the subsequent step $b_7$, a judgement is made whether or not the fetched reception data corresponds to "1" which has been stored in the no error flag "F". In other words, a check is made whether or not there is no error in both the result data and dividend data.

If $F=1$, then another check is done at a step $b_8$ whether or not the prediction data being designated by the display pointer "P" among the respective prediction data corresponding to the race designated in the above register "C", is coincident with the result data among the reception data which have been fetched in the previous step $b_6$. If there is a coincidence between these data, another judgement is made whether or not "1" has been set in the announcing end flag "J" of RAM 15 at a subsequent step $b_9$. Namely, a check is made as to whether or not the announcement has been made that the prediction data has won the race. If $J=0$, then the energizing signal is sent to the speaker drive circuit 21 at a step $b_{10}$. As a result, either the buzzer sound, or the melody sound is produced from the speaker 22 for a predetermined time period, or a predetermined number. Thereafter, "1", is set to the announcing end flag "J" at a step $b_{11}$. On the other hand, if $J=1$ in the above step $b_9$, the announcement has been completed, and the processes defined in the above-described steps $b_{10}$ and $b_{11}$ are not performed. As a result, if the prediction data wins the race, the announcement is carried out. This announcement operation is executed only one time at a first case. Even when the same data is again received thereafter, no further announcement is executed.

Then, at a step $b_{12}$, a payout amount is calculated based upon the ticket fee data and dividend amount data related to the result data and the won prediction data. In the subsequent step $b_{13}$, the payout amount data calculated in the previous step is set to the payout amount memory unit I of the memory region designated by the above display pointer P, and also "1" is set to the corresponding winning flag "K". However, if no coincident is made in the above-described step $b_8$, the processes defined in the steps $b_9$ to $b_{13}$ are not performed and the process is advanced to a step $b_{15}$.

On the other hand, if $F=0$ in the above-described step $b_7$, namely if there is an error in the data, a specific code is set in the payout amount memory unit I of the memory region designated by the display pointer "R" at the step $b_{14}$.

Thereafter, the subsequent prediction data amount the prediction data register "M" is designated by counting up the display pointer "P" by 1 at a step $b_{15}$. At the next step $b_{16}$, a check is made whether or not this data corresponds to the data of the subsequent race. This judgement is performed as follows. That is to say, a judgement is made whether or not the value of the display pointer "P" exceeds over the total prediction data quantity which have been stored into the prediction data number registers from "$R_1$" to one designated by the race designation register "C". If the data does not correspond to the data of the next race, the processes defined by the steps $b_7$ to $b_{14}$ are repeatedly executed to this data. In other words, the above-described processes defined in the step $b_7$ to $b_{11}$ are repeated with respect to the data for every race.

In accordance with the previously explained process on the received data fetch operation, for instance, when the result data of the first race is received at first, the first race is designated by the register C, whereas the register P designates the memory region "$M_2$" of the prediction data register M. In this case, the prediction data "1-6" stored in the memory region $M_2$ shown in FIG. 10 is coincident with the result data "1-6" stored in the memory region $N_0$ of the first race shown in FIG. 11. Moreover, since "1" is not yet stored in the announcing end flag "J", the announcement that the prediction data wins the race is performed by driving the speaker 22 by way of the process defined in the step $b_{10}$. In addition, while the processes defined in the steps $b_{11}$ to $b_{13}$ are performed, as shown in FIG. 12, "1" is stored in the announcing end flag "J" of the memory regions "$M_2$", "7500" ($=1000 \times 750 \div 100$) is stored in the payout amount memory unit I, and also "1" is stored into the prediction wining flag "K". This may be similarly applied to such a case that when the result data on the third race is newly received, the third race is designated by the register "C" and also the memory region $M_6$ of the prediction data register "M" is designated by the register "P". In case that the fourth race is designated by the register "C" and the memory region $M_3$ of the prediction data register M is designated by the register P, since "0" has been stored in the no error flag "F" of the memory region $N_3$ for the fourth race as represented in FIG. 11, the specific code "FFFFFF" is stored into the refound amount memory unit "I" of the memory region $M_8$ as indicated in FIG. 12 according to the step $b_{14}$. It should be noted that since this specific code is not limited to the example shown in FIG. 12, any sort of codes may be used if there are data not used as the normal number data, but also discriminatable from the error.

Readout Key Operation

A detailed operation of the readout key $S_1$ among the various key operations defined by the step $a_5$ shown in FIG. 6 will now be described with reference to FIG. 8.

In FIG. 8, the race designating register C is counted up by "1" in a step $C_1$, so as to designate the subsequent race. At the next step $C_2$, a judgement is made whether or not the content of the race designating register "C" is smaller than 10. That is, a check is made whether or not a designation is made to any race from the first race to the tenth race. If a judgement result is that the content of the register "C" is smaller than, or equal to 10, the process is advanced to a step $C_3$. In this step $C_3$, another judgement is made whether or not the data is stored in the register among the prediction data number registers $R_1$ to $R_{10}$, which corresponds to the race designated by the above-described register "C". If there is no data in this register, the process is returned to the step $C_1$. That is, a check is made whether or not there is a race among the races from the first to tenth races, in which the prediction data has been previously decided.

In the above step $C_3$, if the data is present in the prediction data number register corresponding to the race designated by the register "C", the process is advanced to a step $C_4$. An address of the memory region among the respective memory regions of the prediction data register M, in which the first prediction data corresponding to the race designated by the register "C" has been stored, is set to the display pointer "P". Then, at a step $C_5$, a judgement is made whether or not the specific code (corresponding to "FFFFFF" represented in FIG. 12) has been stored in the payout amount memory unit I of the memory region designated by the display pointer "P". If the specific code has been stored, a specific code display process is performed so as to announce the error data at a step $C_6$. On the other hand, if no specific code has been store in the payout amount memory unit I in the step $C_5$, the process is advanced to a step $C_7$. In this step $C_7$, a check is made whether or not "1" has been set in the winning flag "k" of the memory region which has been designated by the display pointer "P". If "1" has been set in the winning flag "k", a flashing display process is carried out at a step $C_8$ so that the prediction data wins the race. Conversely, if "1" is not set in the winning flag "k" in the above step $C_7$, the process is advanced to a step $C_9$. In this step $C_9$, a stationary display is performed instead of the above-described flashing display.

After any one of the above-described display processes $C_6$, $C_8$, and $C_9$ by the above display pointer "P", this display pointer "P" is counted up by 1 at a step $C_{10}$, so that the data stored in the subsequent memory region within the prediction data register M is designated. Subsequently, a check is made whether or not the data designated corresponds to data on the next race at a step $C_{11}$. If this data is not yet equal to the next data, the process is returned to the above-described step $C_5$. Conversely, if this data corresponds to the data on the subsequent race, a further process is accomplished. That is, all of the data on one race are entirey displayed in any display mode by way of the steps $C_4$ to $C_{11}$.

If, on the other hand, the content of the race designating register "C" is greater than 10 in the previous step $C_2$, the process is advanced to a step $C_{12}$, in which calculations are performed with respect to a total of the ticket fee amounts and also another total of the payout amounts for all of the races. In the next step $C_{13}$, the calculation results are displayed on the display unit 2. Thereafter, "0" is set to the race designating register "C" at a step $C_{14}$ and this process is completed.

In accordance with the above-described key process by manipulating the readout key $S_1$, both the prediction data and ticket fee amount data for the respective races are displayed, as represented in display examples "a" to "e" of FIG. 13 every time the readout key $S_1$ is operated. In this case, when the specific code is not stored in the payout amount memory unit I, and "1" is not set in the winning flag "k", the normal stationary display operation is carried out (refer to step $C_9$). In other cases, the display conditions are varied as follows. In case that the specific code has been stored in the refound amount memory unit I, as represented in the display example "d", a specific display is performed in such a manner that this display data is surrounded (refer to the steps $C_5$ and $C_6$). As a result, the reconfirmation as to the displayed data is announced to a user because it is impossible to judge whether or not the predicted winner really wins the race, and the error is present in the race result data corresponding to the displayed data. In case that "1" is set to the winning flag "k", as represented in, for instance, the display examples "a" and "c", only the winning data is displayed in the flashing form (indicated by the dot line) (see the steps $C_7$ and $C_8$.)

Furthermore, for example, if the readout key $S_1$ is manipulated 5 times, although the prediction data have been set until the fourth race, the display example "d" of the fourth race is changed into the display example "e" of the total amount (refer to the steps $C_{12}$ and $C_{13}$). This display example "e" indicates that the total amount of the ticket fee is 12,000 U.S. dollars (OUT-12000), the total amount of the payout amount is 16,000 U.S. dollars (IN-16000), and a profit amount is 4,000 U.S. dollars (+4000). Under this display condition, when the readout key $S_1$ is again operated, the display condition is a gain returned to the example "e" of the first race (refer to the steps $C_{14}$, $C_1$ and so on).

Confirmation Key Operation

Under the display conditions by the readout key $S_1$, when the confirmation key $S_2$ is operated, a detailed confirmation key operation is executed as follows with reference to FIG. 9.

At a first step $d_1$ shown in FIG. 9, the address of the memory region among the respective memory regions of the prediction data register "M", in which the first prediction data corresponding to the race designated by the race designating flag "c" has been stored, is set to the display pointer "P". In the subsequent step $d_2$, a judgement is made whether or not a specific code ("FFFFFF" shown in FIG. 12) has been stored in the refound amount memory unit I of the memory region designated by the display pointer "P". If there is the specific code, then the process is advanced to a step $d_3$. In this step $d_3$, a specific code display is carried out so as to announce that no information is available whether or not the prediction data on this race wins the race, and also how much money is paid out.

If the specific code is not stored in the refound amount memory unit I in the step $d_2$, the process is advanced to a step $d_4$. In this step $d_4$, a check is made whether or not "1" has been set in the winning flag "k" of the memory region designated by the display pointer "P". If "1" is not set, the racing result, dividend amount, ticket fee amount and payout amount are displayed in the flashing mode in a step $d_5$.

Also, in the above step $d_4$, if "1" is not set in the winning flag "k", the process is advanced to a step $d_6$. In this step $d_6$, the content of the display pointer "P" is counted up by "1" in order to designate the data on the subsequent memory region. In the next step $d_7$, a judgement is made whether or not this designated data corresponds to data on the next race. If the designated data does not correspond to the next data, the process is returned to a step $d_2$, in which the process similar to the above-described process is repeated. To the contrary, if the designated data corresponds to the data on the next race, to announce that neither an error, nor winning the race occurs in the race which has been designated by the register "C" at a step $d_8$, the result of the race dividend amount, ticket fee amount, and payout amount are merely displayed in the stationary display mode.

According to the key process effected by operating the confirmation key $S_2$, when the confirmation key $S_2$ is operated under the whole display conditions (refer to the display examples "a" to "d" represented in FIG. 13) every time the readout key $S_1$ is operated in each race, for instance, the display example "i" of "?????" is displayed in case that the above-described whole display corresponds to the specific code display (see the steps $d_2$ and $d_3$). As a consequence, it can be clarified that no definite information whether or not the prediction wins the race, and what amount the payout money becomes is obtained. When the above-described whole display includes the flashing display by which the prediction wins the race, as represented in the previous examples "a" and "c", only the data relating to the won racing result is displayed in the flashing mode, as indicated in the examples "f" and "h". In the display example "f", for instance, the racing result is "1-6"; the dividend amount per 100 dollars is equal to 750 dollars ("750"); the ticket fee of this predicted race is 1,000 dollars (OUT-1000); and the payout amount is 7,500 dollars ("IN-7500"). In case that the above-described whole display includes neither the flashing display, nor specific code display, as represented in the example "b", the racing result ("2-8"); the dividend amount ("1200"); ticket amount ("OUT-0"); and the payout amount ("IN-0") are displayed in the stationary display mode.

While the preferred embodiment has been described above, the racing results can be immediately recognized by way of the wireless communication. Furthermore, a user can readily recognize that his prediction wins the race, and therefore the payout amount based upon the won racing result. In addition, since the specific code is displayed in case that there are great probabilities that an error is contained in the received data, the reliability on the displayed content is improved.

Also, according to the present embodiment, a user can immediately recognize by way of a sound that his prediction wins the race. Moreover, even when the same racing result data are received many times, such a sound announcement is made only once, which can prevent the user from being bothered.

Second Radio Receiver

As previously described, in the radio receiver according to the first preferred embodiment, this radio receiver was lent from the horse racing stadium and the signals transmitted from the horse racing stadium were received by all of the radio receivers without any exception. Alternatively, the message concerning the racing results may be separately transmitted outside the horse racing stadium when a user contracts to do so with the present pager firm. To this end, both an ID-ROM 23 and an address coincidence detecting circuit 24 shown in FIG. 14 are employed between the BCH error correcting circuit 6 and S-P converting circuit 9. Also a signal format of this transmission signal may be used as shown in FIG. 15.

Figure 15:
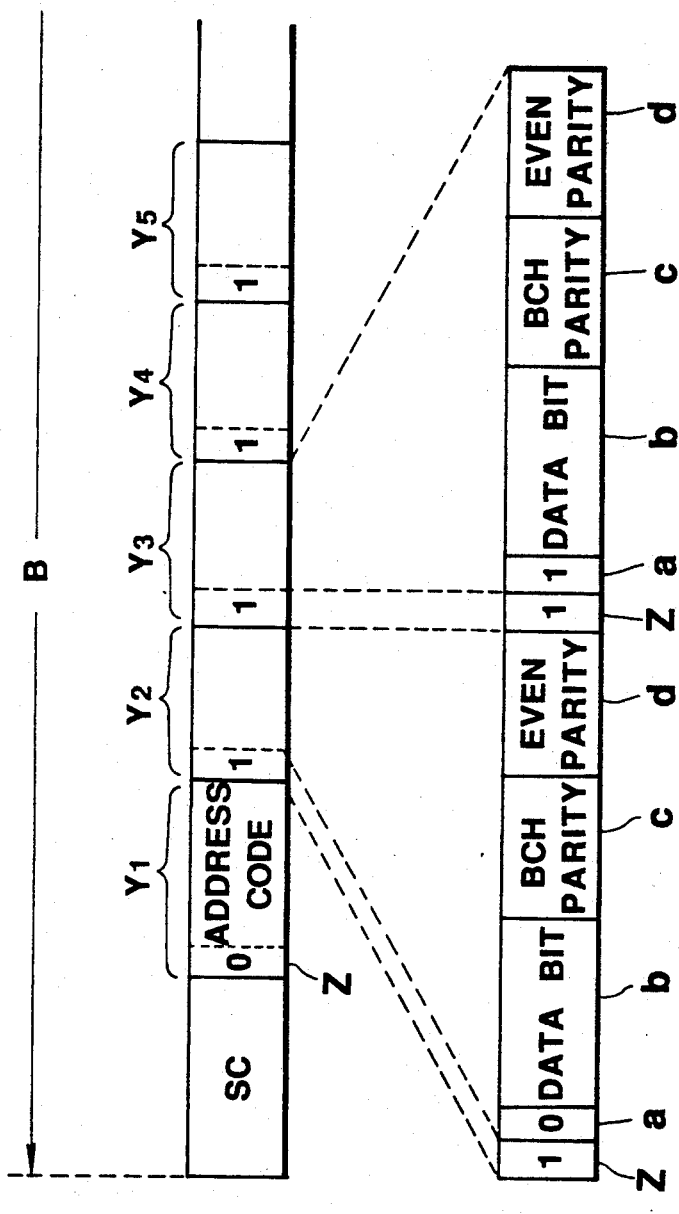

It should be noted in the signal format of FIG. 15 that a batch signal "B" is arranged by a synchronous code "SC" and a plurality of code words $Y_1$, $Y_2$, $Y_3$, —. An identification flag "Z" is arranged on each head of the respective code words $Y_1$, $Y_2$, $Y_3$, —. Subsequently, an address code and message data are arranged. In case that data succeeding to the identification flag "Z" corresponds to an address code, this identification code is set to "0". When the succeeding data corresponds to the message data, "1" is set into this identification flag. This address code correpsonds to a code of a self calling number. This message data is arranged by the racing result and dividend data similar to those of "Z" shown in FIG. 3. In this example, two code words constitute data on a single race.

In the circuit shown in FIG. 14, the function of ID-ROM 23 is a read-only memory for previously storing a self address. The address coincidence detecting circuit 24 detects whether or not the address code (see FIG. 15) contained in the received data is coincident with the self address which has been stored in ID-ROM 23. When a coincidence is detected, the address coincidence detecting circuit 24 transmits a coincidence detecting signal to the S-P converting circuit 9 so as to energize the S-P converting circuit 9. With the above-described circuit arrangement, only the message data which has been transmitted to the self radio receiver is fetched thereby so that verious data similar to the first preferred embodiment can be displayed.

It should be noted in the above-described embodiments that the display condition when the prediction wins the race was the flashing condition when the error data was contained in the received data was the frame display mode. However, the present invention is not limited to these display modes, but any display modes capable of reporting that the prediction wins the race, and the error is contained in the received data, may be employed.

Furthermore, although the first and second preferred embodiments described the horse race, lucky numbers of a lottery may be alternatively transmitted under contract with a pager firm.

In this case, the prediction data which should be input by the input unit of the radio receiver corresponds to a number/numbers of a lottery bought by user. This input data may includes character data since there are plural lucky numbers transmitted from the pager firm, the refound amounts corresponding to each of the lucky numbers may be simultaneously transmitted.

In the receiver, at the step "$b_8$" shown in FIG. 7, a comparison is made between the previously input number and a plenty of received numbers. If there is a coincidence, the lucky number and the refound amount are stored in RAM and displayed on the display unit, and furthermore an announcement may be performed.

Third Radio Receiver

Figure 16:
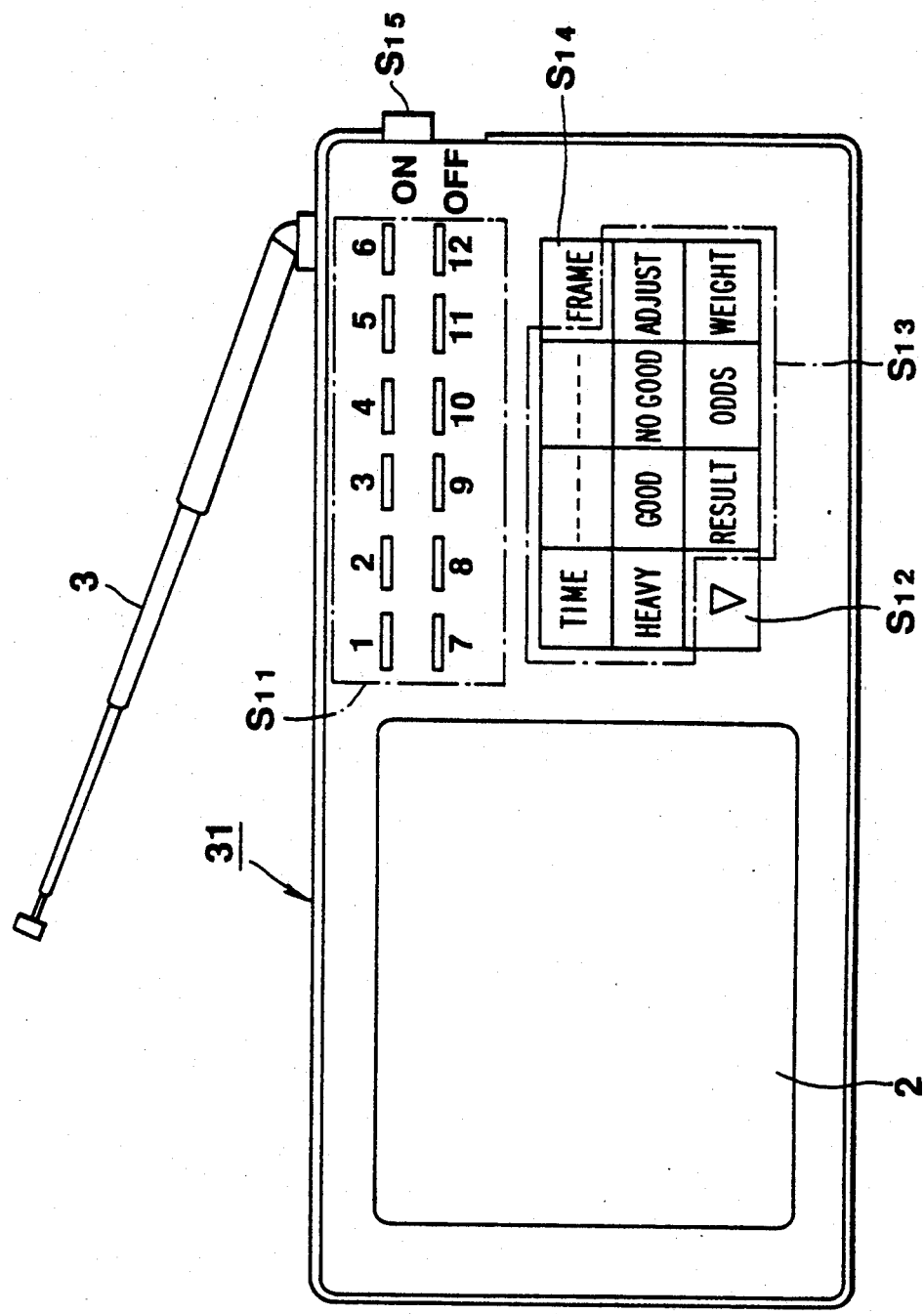

FIG. 16 is a perspective view of a radio receiver according to a third preferred embodiment of the invention. It should be noted that the same reference numerals shown in FIG. 1 will be employed as those for denoting the same or similar arrangement.

In the arrangement of FIG. 16, various keys $S_{11}$ to $S_{14}$ are arranged in the right side of the display unit 2. The function of the key $S_1$ is a race designating key for designating a desirable race among a plurality of races. This race designating key is arranged by 12 keys corresponding to the respective keys. The key $S_{12}$ corresponds to a search key for sequentially changing the sorts of the data selected by the $S_{13}$ among the various stored data so as to display the designated data. The key $S_{13}$ is a data sort designating key for selecting only a desired single sort of data among a plurality of stored sort data for the display purposed. This data sort designating key is arranged by, for instance, a result key for designating a race result data; an odds key for designating odds data; a weight key for designating data on a horse weight; and an adjusting key for designating data on an adjusting condition of a horse. The key $S_{14}$ is a frame (gate) designating key for designating a desired frame from a plurality of frames (horse order or horse starting gate) and for displaying all sorts of data with respect to this frame within one time. A main switch $S_{15}$ is provided on the upper side portion of the receiver body 31 so as to turn ON/OFF the supply of the power to the circuits functioning as only reception.

Circuit Arrangement of Third Radio Receiver

Figure 17:
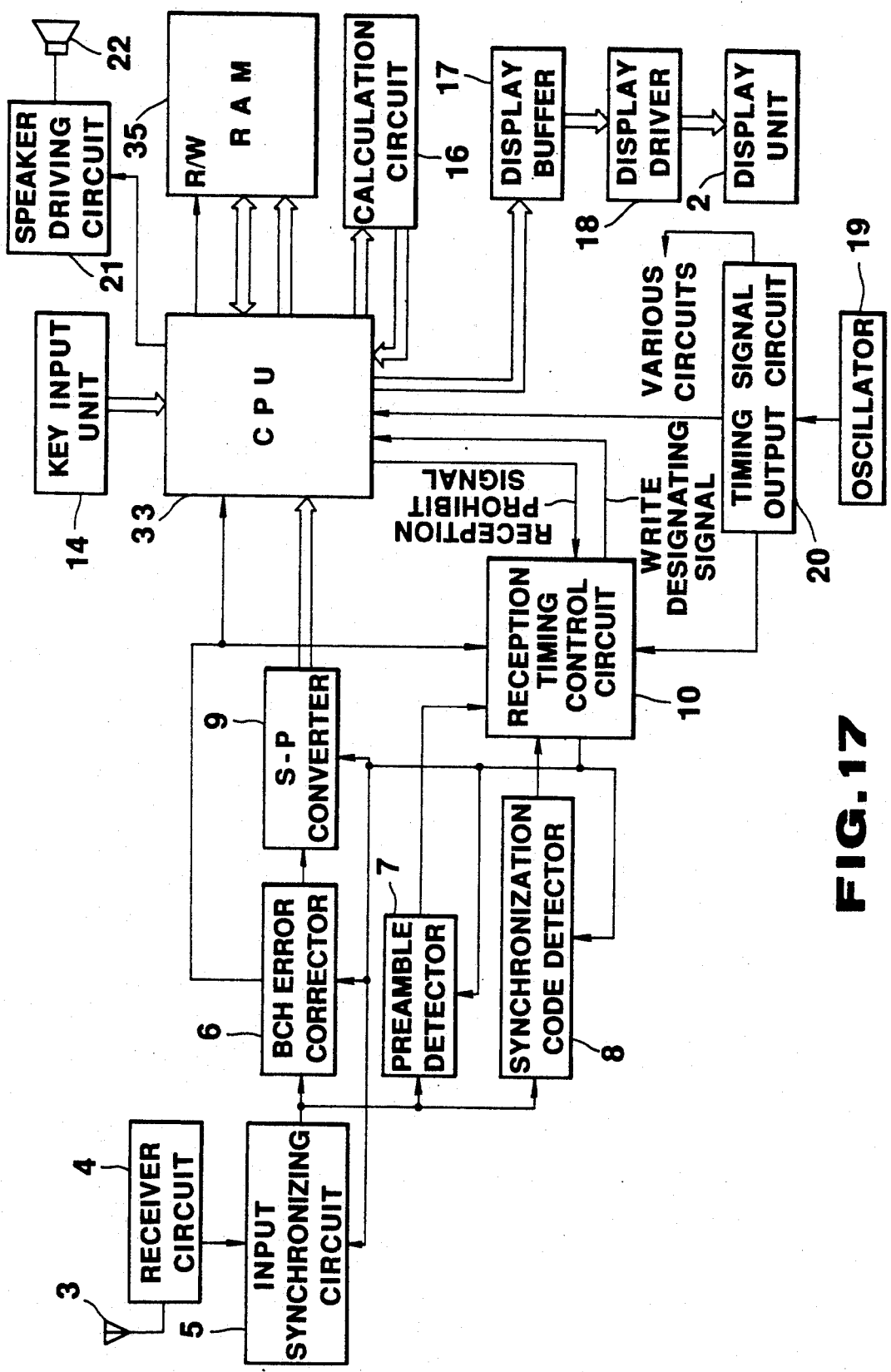

In FIG. 17, there is shown a block diagram of a circuit of the radio receiver body 31 represented in FIG. 16. As apparent from a comparison between the circuit diagram of FIG. 2 and that of FIG. 17, only different points are as follows. That is, RAM 11 and the RAM control unit 12 in FIG. 2 are not employed; RAM 35 is newly employed instead of RAM 15 shown in FIG. 2; CPU 33 is newly employed so as to perform a different processing operation to CPU 11 shown in FIG. 2; and also a write designating signal instead of the end signal of FIG. 2 is supplied to CPU 33 from the reception timing control circuit 10. It should be noted that the same reference numerals shown in FIG. 2 will be employed as those for denoting the same or similar circuit elements represented in FIG. 17, and no further explanation thereof will be made in the following description.

Figure 18:
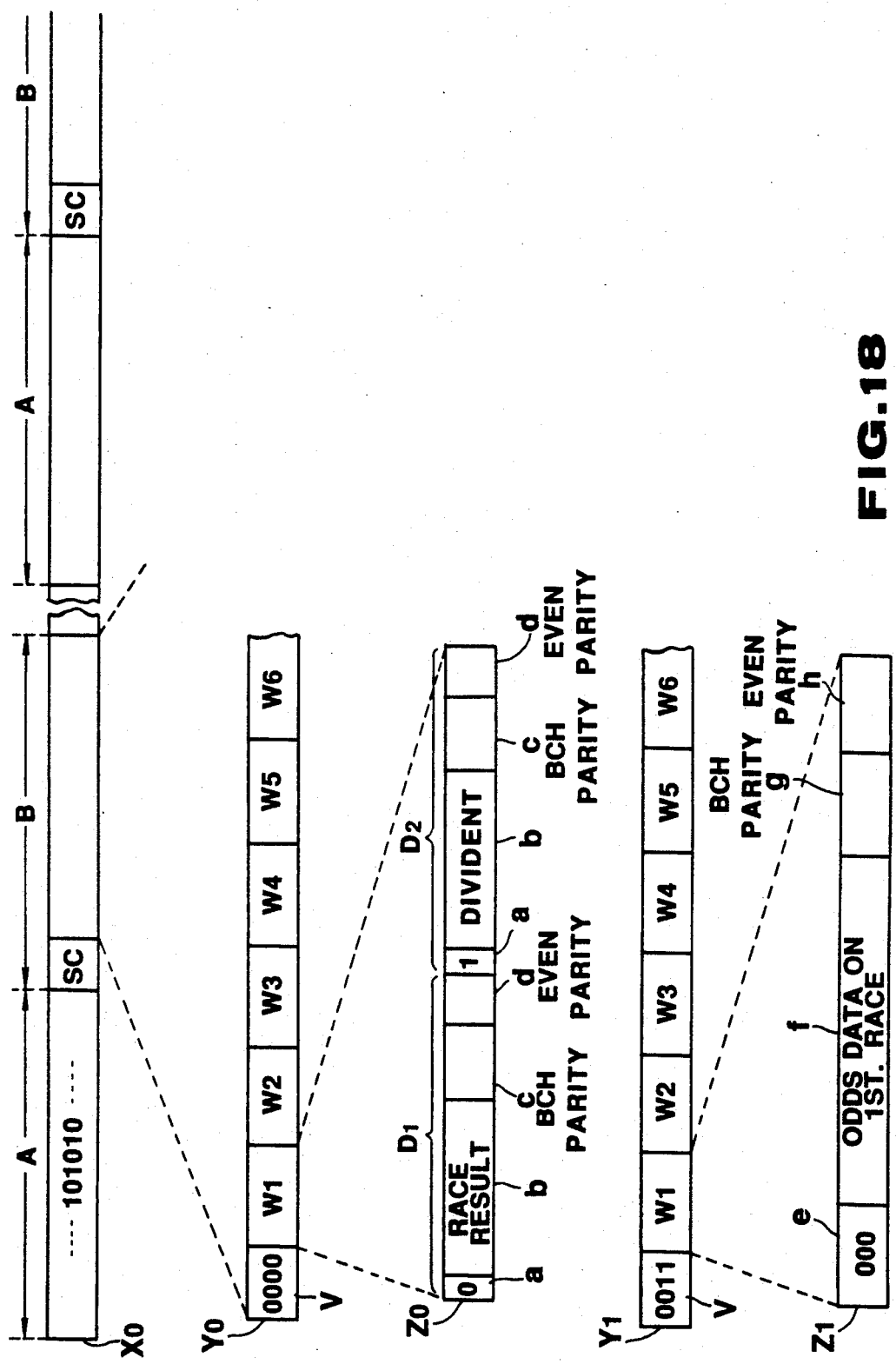

When the race identification code V is equal to any of codes "0000", "0001", as represented in "$Z_0$" of FIG. 18, the above codes are arranged by the code word $D_1$ representative of the race result data, and another code word $D_2$ indicative of the dividend amount data corresponding to this result data. Then, each of these two code words $D_1$ and $D_2$ is constructed of an identification flag "a", a data bit "b", a BCH parity "c" an an even parity "d". It should be noted that the identification flag "a" is set to "0" when the subsequent data bit "b" corresponds to the race result data, whereas the identification flag "a" is set to "1" when the next data bit "b" corresponds to the dividend amount data. The function of the BCH parity "c" is a bit for correcting an error occurring within the code. The even parity "d" is a bit for representing that a total number of the bits indicative of "1" from the head bit to the last bit is equal to an odd number, or an even number. For instance, in case that there is one bit error between "1" and "0", a judgement can be done by checking this even parity whether or not the bit is dropped or added.

On the other hand, when the race identification code is equal to other codes, as represented in "$Z_1$" of FIG. 18, the above codes are arranged by a data identification code "e", a data bit "f", a BCH parity "g", and an even parity "h". It should be noted that the data identification code "e" is constructed of a 3-bit signal corresponding to the sort of the data contained in the subsequent data bit "f". For example, with respect to the odds data, "000" is set. With respect to the horse weight data, "001" is set. Both the BCH parity "g" and even parity "h" are identical to the above-described BCH parity "c" and even parity "d".

RAM 35 shown in FIG. 17 has an arrangement as shown in FIG. 20. In FIG. 20, a register "R" corresponds to the race result register for storing the result data and the dividend amount data with respect to all of the races, and is constructed of a plurality of memory regions which correspond to each race. Subsequent registers X, Y, Z, —etc. are storing various data with respect to the races designated by the race designation key $S_{11}$ shown in FIG. 16, depending upon the data sorts. For instance, the registers X, Y, and Z store the odds data on the respective racing combinations, the weight data on the respective horses, and the race result data on each horse in the heavy going track.

The race identification code register K is a register for storing a race identification code (see FIG. 19, note only codes after "0011" corresponding to the respective races) in accordance with the operation of the race designation key $S_{11}$. The timer register "S" is a timer register used as, for instance, a 10-second timer. This timer register outputs the reception prohibit signal for only 10 seconds when the key is operated. The reception accept/prohibit flag register "L" stores "1" when the key is operated, and stores "0" when the timer register "S" times up. While "1" is stored in this flag register, the above-described reception prohibit signal is output whereby the reception operation is prohibited. A display pointer "P" is a pointer for designating data to be displayed on the display unit 2 among a plurality of data which have been stored in the respective memory regions. A frame designation pointer "C" is a pointer for designating a frame of one race in response to the operation of the frame designation key $S_{14}$.

Major Processing Operation

Referring now to FIGS. 21 to 25, a major processing operation under control of CPU 33 of the third preferred embodiment will be described. In the third preferred embodiment, a code format of a signal transmitted from a radio transmitter station is so arranged, for example, as shown in FIG. 18. In this code format, as indicated by $X_0$ of FIG. 18, a preamble signal "A" constructed by repeating "1" and "0" is positioned at a head thereof, and subsequently a batch signal "B" is arranged. The function of this preamble signal is to cause the radio receiver to be perceivable that data will be transmitted from now on, and to establish an input synchronization. The batch signal "B" is constructed by a synchronization code "SC" positioned at a head portion thereof, a plurality of codes $W_1$, $W_2$, $W_3$, —containing various data relating to the races as represented by $Y_0$ and $Y_1$ of FIG. 18; and also a race identification code V for identifying which races correspond to these data.

This code identification code V is constructed of 4-bit data corresponding to the data contained in the succeeding codes $W_1$, $W_2$, $W_3$, —. As represented in FIG. 19, the race identification codes in a left column thereof correspond to the data on the respective races in a right column thereof As shown in "$Z_0$" of FIG. 18, for instance, both the race result data on the either order forecast with respect to all of the races, and the race identification code V corresponding to the dividend data become "0000" as indicated by "$Y_0$" of FIG. 18. Also, the race identification code V corresponding to various data (note that these data do not include the race result data and devident data) with respect to the first race shown in "$Z_1$" of FIG. 18, becomes "0011" of "$Y_1$" in FIG. 18.

The arrangements of the above-described codes $W_1$, $W_2$, $W_3$, —are determined based upon such a condition that the race identification code V corresponds to either "0001" and "0010", or other codes.

Figure 21:
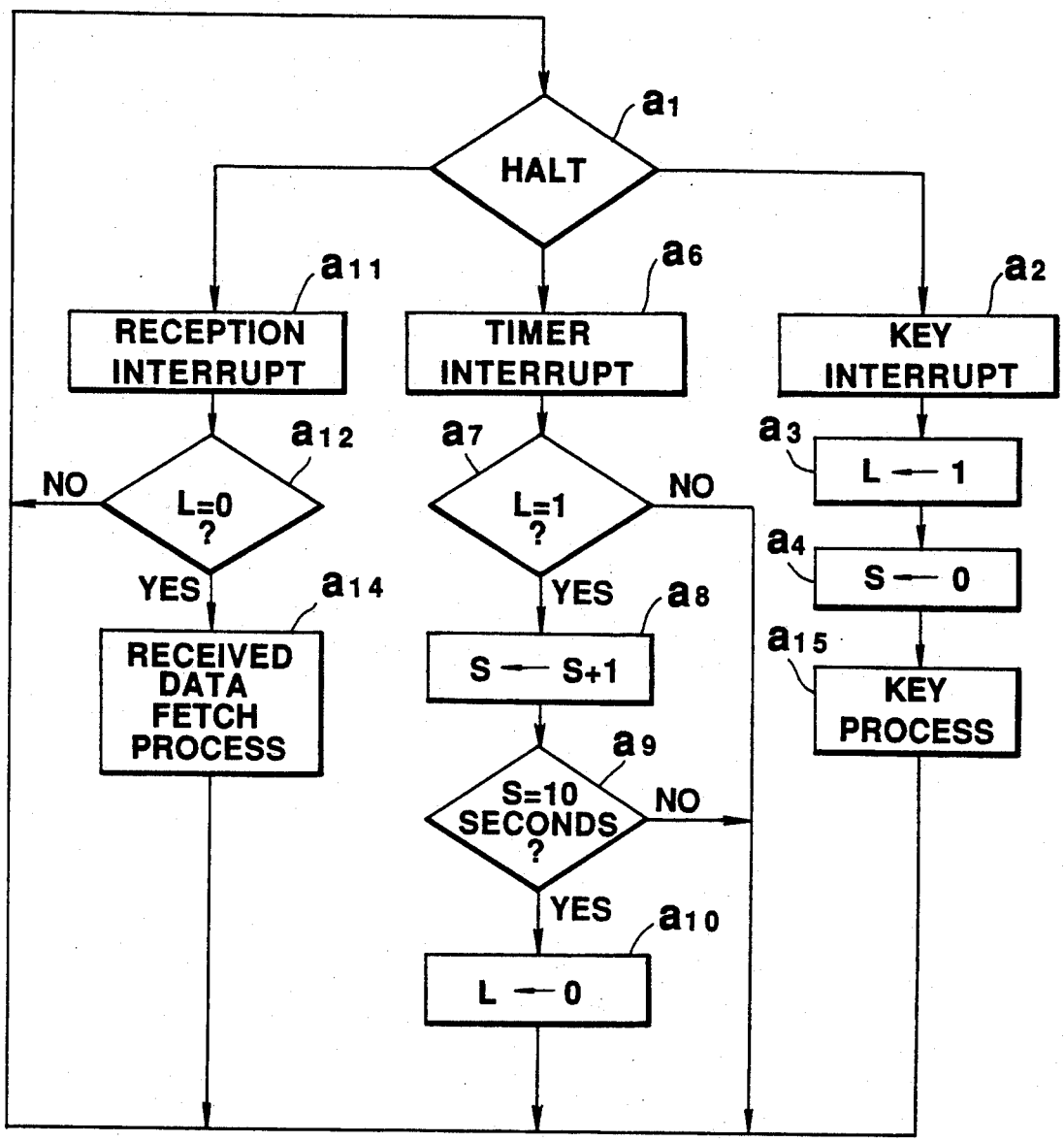

In FIG. 21, there is shown a flowchart for explaining an entire processing operation of the third preferred embodiment, which is the substantially same as the flowchart of the first preferred, embodiment shown in FIG. 6. However, both a received data fetch process defined in a step $a_{14}$ and a key process defined in a step $a_{15}$ are different from the entire processing operation of the first preferred embodiment. Accordingly, the same step numbers as those of FIG. 6 will be employed for denoting the remaining steps and no further explanation thereof is made in the following description.

Figure 22:
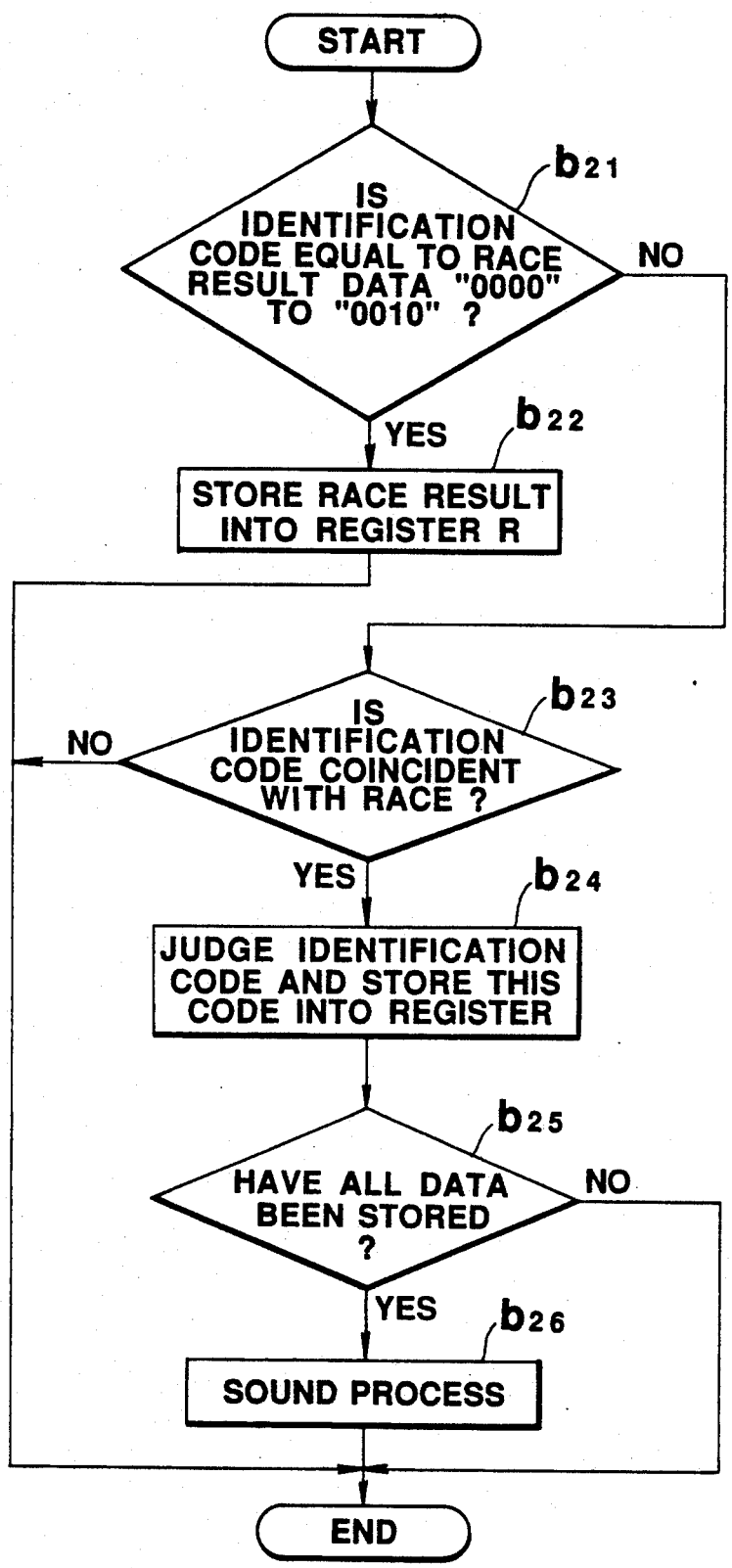

FIG. 22 represents a detailed operation of the above-described received data fetch process defined in the step $a_{14}$ shown in FIG. 21.

First, at a step $b_{21}$, a judgement is made whether or not the race identification code V (see FIGS. 18 and 19) of the received data corresponds to any of "0000" through "0010", namely the race result data. If the race identification code V corresponds to the race result data, the process is advanced to a step $b_{22}$, at which the race result data is stored in the race result register "R" of RAM 13.

If a judgement is made that the race identification code V does not correspond to the race result data at the previous step $b_{21}$, the process is advanced to a step $b_{23}$. In this step $b_{23}$, a check is made whether or not the race identification code V of the received data is coincident with another race identification code stored in the race identification code register "K" which has been designated by the race designation key $S_{11}$. If there is a coincidence, the process is advanced to a step $b_{24}$. In this step $b_{24}$, a judgement is made whether or not a data identification code "e" (see "e" of FIG. 18) of the various data contained in the received data corresponds to a sort of data. Depending upon the sort of the data, this identification code is stored into the corresponding registers X, Y, Z, —etc. Thereafter, at a step $b_{25}$, a check is made whether or not all of the data have been stored in the corresponding registers. If yes, then an energizing signal is supplied to the speaker driving circuit 21 shown in FIG. 17 so as to output an announcing sound from the speaker 22.

In accordance with the processes defined in the above-described steps $b_{21}$ to $b_{26}$, since any of the race result data on the either order forecast, win, and place/show forecast are the absolutely necessary data, when these data are received, these data are stored in RAM 35 without any restriction even if the received data corresponds to the data of any races (see the steps $b_{21}$ and $b_{22}$). When, on the other hand, the data other than the above-described race result data are received, for instance, the odds data, horse weight data, race prediction data, and achievement data on the past race, only the data relating to the desirable race which has been previously designated by the race designation key $S_{11}$ shown in FIG. 16 is classified and stored into RAM 35. Then, when the data storage operation is accomplished, the sound is produced from the speaker 22. For instance, under such a condition that the race identification code "0100" has been stored into the race identification register "K" by operating the race designation key $S_{11}$ to designate the second race, when the various data relating to the second race is received, these data are stored in the corresponding memory regions of RAM 35, and the sound is generated from the speaker 22. As a result, an operator can immediately confirm that the data on the desirable race has been received.

Then, the key process defined in the step $a_{15}$ of FIG. 21 will now be described in detail with reference to a flowchart shown in FIG. 23.

Figure 23:
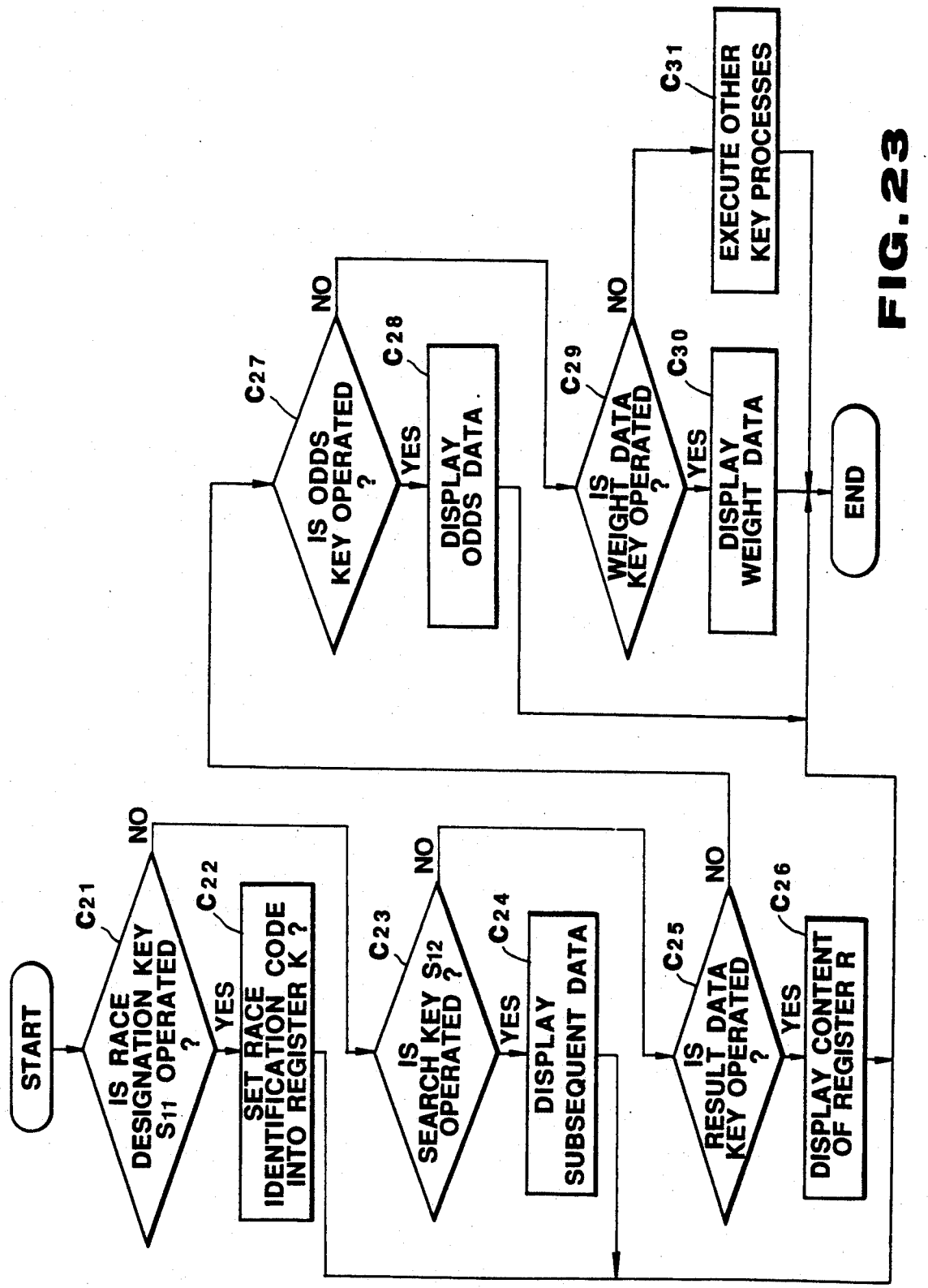

In the key processing flowchart shown in FIG. 23, a check is done whether or not the operated key correpsonds to the race designation key $S_{11}$ at a step $C_{21}$. If yes, then the process is advanced to a step $C_{22}$, in which the race identification code corresponding to the designated race is set into the race identification code register K. As a result, when the data other than the race result data are received, only the data related to the race which has been designated by the above-described race designation key $S_{11}$ in the previous steps $b_{22}$ and $b_{24}$ shown in FIG. 22 are stored.

If a judgement is made that the operated key does not correspond to the race designation key $S_{11}$ at the step $C_{21}$ shown in FIG. 23, the process is advanced to a step $C_{23}$ in which another check is made whether or not the operated key correpsonds to the search key $S_{12}$. If yes, then the content of the display pointer "P" is counted up by 1 in a step $C_{24}$, so that a designation is made to data on the next page from the registers R, X, Y, Z —for storing the various data under display, and the designated data is displayed on the display unit 2.

To the contrary, when a judgement is made that the operated key is not the search key $S_{12}$ at the step $C_{23}$, another judgement is made whether or not the operated key corresponds to the result key among the data sort designation key $S_{13}$ at the next step $C_{25}$. If yes, then the process is advanced to a step $C_{26}$. In this step $C_{26}$, both the race result data and dividend amount data which have been stored in the race result register "R" are read out and thereafter displayed on the display unit 2. Conversely, if no at the step $C_{25}$, a judgement is made whether or not the operated key corresponds to the odds key among the data sort designation key $S_{13}$ at a step $C_{27}$. If yes, then both the combination data such as "1—1" and the odds data thereof which have been stored in the odds data register X are read and thus displayed on the display unit 2. In the above step $C_{27}$, when a judgement is made that the operated key does not correspond to the odds key, another judgement is carried out at a step $C_{19}$. Whether or not the operated key corresponds to a weight key among the data sort designation key $S_{13}$. If yes, then the process is advanced to a step $C_{30}$. At this step $C_{30}$, both the horse name data and weight data thereof which have been stored in the weight data register Y. To the contrary, if no at the step $C_{29}$, then the process is advanced to a step $C_{31}$ in which the key processes corresponding to other key operations will be executed.

As a result of the processes effected in the above-explained steps $C_{25}$ to $C_{31}$, when the desirable data sort is designated by operating the data sort designation key $S_{13}$, the above-described data is selected from the various data stored in RAM 13 and displayed. For instance, when the result key is operated, as represented in the display example "a" of FIG. 25A, both the race result data (in this example, the either order force cast data) and the dividend amount data for the respective races can be displayed. In this display example "a", for instance, "2R" indicates the second race, numerals "3-6" beside "2R" represents the race result of the either order forecast with respect to the second race, and furthermore numeral "280" denotes the odds, i.e., the refound amount per 100 U.S. dollars. When the weight key is operated, the weight data on the respective horses are displayed as represented in the example "C" of FIG. 25B. In this display example "C", for instance, symbols "A", "B", and "C" represent the horse names, and numerals "450"; "470"; "500" indicate the horse weights (unit:kg). Further, when the search key "$S_2$" is operated under the condition that these various data are displayed, the data on the next page can be displayed as represented in the example "b" by performing the processes defined in the steps $C_{23}$ and $C_{24}$ of FIG. 23.

Figure 24:
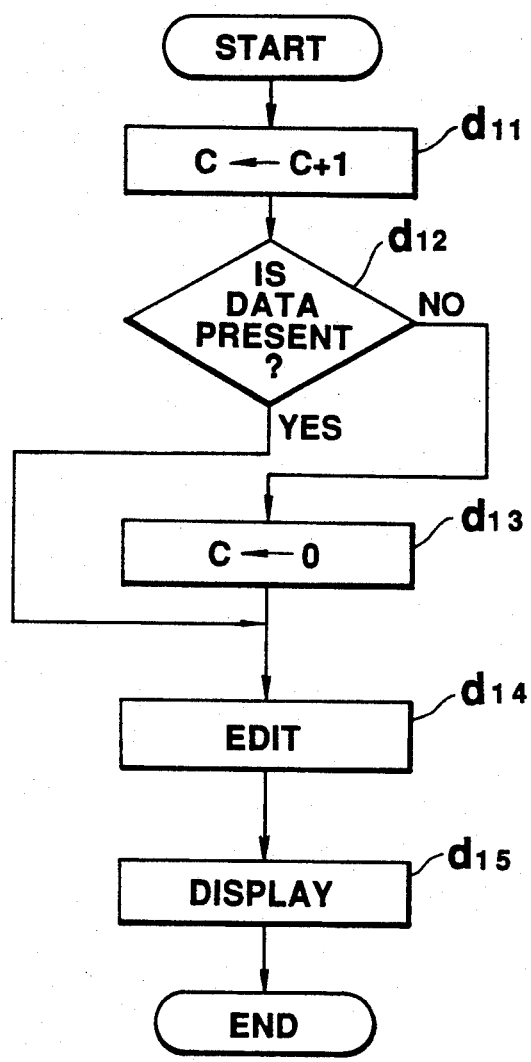

Then, when in particular, the frame designation key $S_{14}$ is operated in the other key process defined in the step $C_{31}$ of FIG. 23, the following process will be executed as shown in a flowchart of FIG. 24.

In the process defined in FIG. 24, the frame designation pointer "C" is counted up by 1 at a step $d_{11}$ so as to designate the next frame (next horse number). At the subsequent step $d_{12}$, a check is made whether or not the data concerning the designated horse has been stored. In other words, a judgement is made whether or not the horse within the designated frame participates in the race. If no such a data has been stored, since the horse after this designated frame will not participate in the succeeding race, the frame designation pointer "C" is reset at a step $d_{13}$. To the contrary, when such a data has been stored, since this designated horse participates in the race, the content of the frame designation pointer "C" remains. In the next step $d_{14}$, all of the data on the horse of the frame designated by the frame designation pointer "C" are read out from the respective registers of RAM 35, and then edited, and further displayed on the display unit 2 at the next step $d_{15}$.

In accordance with the processes defined by the above-described steps $d_{11}$ to $d_{15}$, every time the frame designation key $S_{14}$ is operated, all of the data with respect to the single frame which have been stored in RAM are sequentially changed in the frame unit and then displayed. For instance, in case that the first frame is designated by the frame designation pointer "C" by operating the frame designation key $S_{14}$, as represented in the display example "d" of FIG. 25C, all of the data relating to the first frame are displayed within one time. In this display example "d", numeral "1" in the block indicates the first frame, symbol "A" beside the numeral "1" represents the horse name, and numeral "450" beside the symbol "A" denotes the horse weight (Kg). Symbols "heavy" "good" and "no good" under the above numerals represent the achievements in the past races at the heavy horse stadium, good horse stadium, and no-good horse stadium. The four digit numerls "0020" of the achievements indicate the times of the first prize, second prize, third prize, and out of prize in this order from the left numeral to the right numeral. Furthermore, numerals "1200 1. 13.7" under the above indications represent that the recorded time in the past race of 1200 meters is 1 minute 13.7 seconds. Another numeral "1600 1. 34.S" denotes that the recorded time in the past race of 1600 meters is 1 minute 34.5 seconds.

As previously described, according to the third radio receiver, both the absolutely necessary result data on all of the races among the received various data, and the various data relating to the desirable race which has been previously designated are stored, and can be immediately displayed by operating the key $S_3$. As a consequence, there is not such a problem that the data required for the user are not head by the conventional receiver. Furthermore, it can prevent such a cumbersome workload that a user must go to see the sign board in the horse race stadium. As to the various data other than the result data, since only the data relating to the race designated by the race designation key $S_{11}$ is stored, the memory capacity of RAM 35 may be made small, and also the radio receiver may be made compact. In addition, since all of the data on the desirable frame can be displayed within one time, detailed information on the respective frames can be provided to the user.

Arrangement of Fourth Radio Receiver

Figure 26:
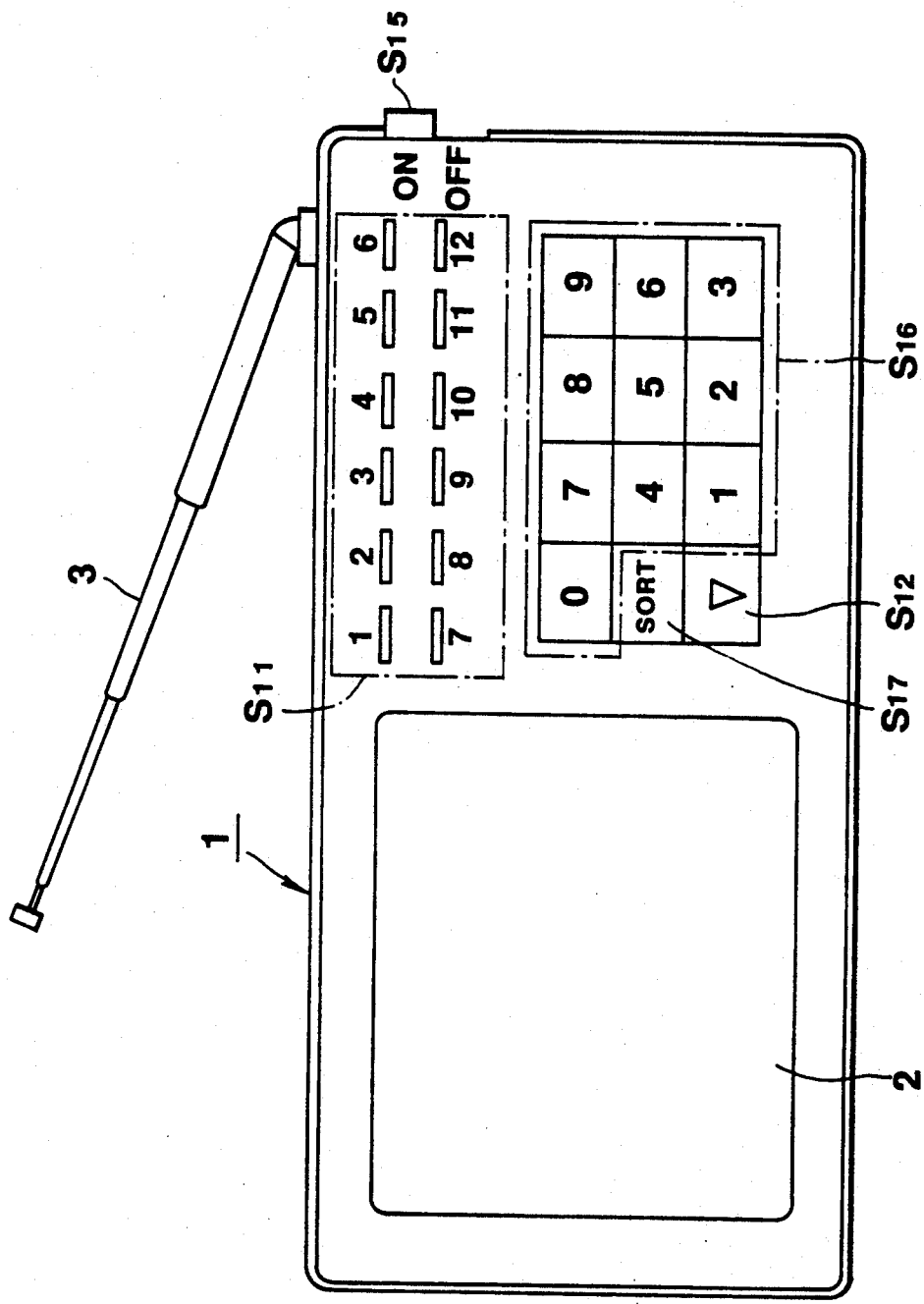

In FIG. 26, there is shown a perspective view of a radio receiver according to a fourth preferred embodiment of the present invention.

As apparent from FIG. 26, both a numeral key "$S_{16}$" for designation key "$S_{17}$" are newly employed instead of the keys $S_{13}$ and $S_{14}$ shown in the third radio receiver of FIG. 16. This frame designating numeral key $S_{16}$ is to selectively designate only the data relating to the desirable frame, gate or horse number among the various data stored in RAM and to display the designated data. The numeral key $S_{16}$ is constructed of 10 keys from "0" to "9". For instance, when the numeral keys "1" and "2" are continuously operated, a "twelfth frame" is designated. The data sort designating key "$S_{17}$" is to designate the desirable sort among a plurality of sorts of the data concerning the race, and to display the data on all of the frames corresponding to the designated sort.

Figure 27:
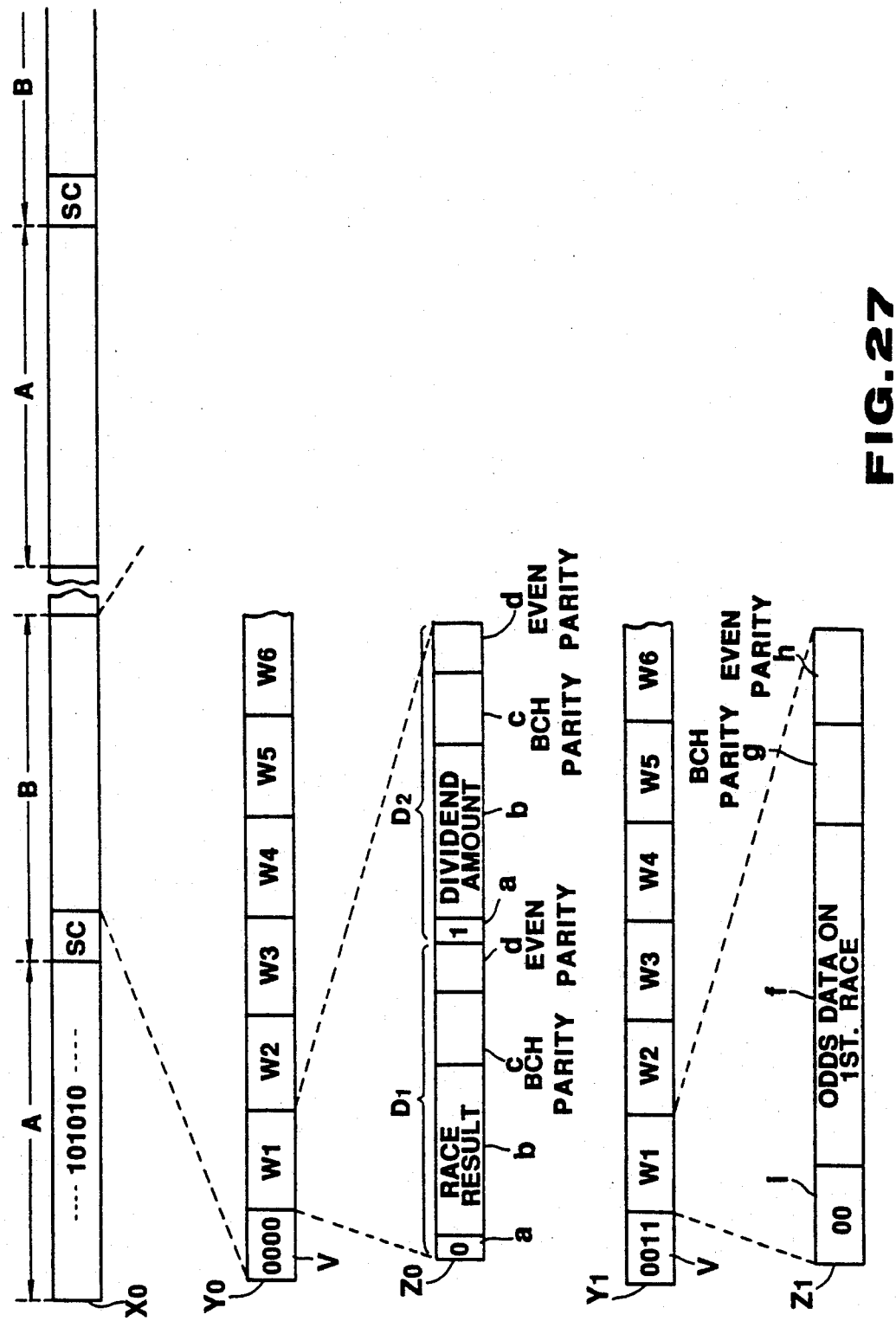

The overall circuit arrangement of the fourth radio receiver is similar to that of the third radio receiver shown in FIG. 17. It should be noted that a signal format of a transmission signal employed in the fourth radio receiver is represented in FIG. 27, which is similar to that of FIG. 18. However, a frame code "i" is newly used instead of the data identification code "e" shown in FIG. 18. This frame code "i" is a code which is set based upon such a condition that the data contained in the succeeding data bit "f" corresponds to the data relating to the order of the frame.

In FIG. 28, there is shown memory regions of RAM 35. In this arrangement, registers $Q_1$, $Q_2$, $Q_3$ —indicate registers for storing the various data relating to the race which has been designated by the race designation key $S_{11}$ every frame. For instance, the registers $Q_1$, $Q_2$ and $Q_3$ correspond to registers for storing the various data concerning the first frame, second frame, and third frame, respectively. A sort designating pointer "D" is a key for designating the sorts of the data corresponding to the operation of the data sort designating key $S_{17}$. Other circuit elements such as the race identification code register "K", timer register "S", reception accept/prohibit flag register "L", display pointer "P" and race result register "R" are the same as those shown in FIG. 20.

Typical Processing Operations of Fourth Radio Receiver

Figure 29:
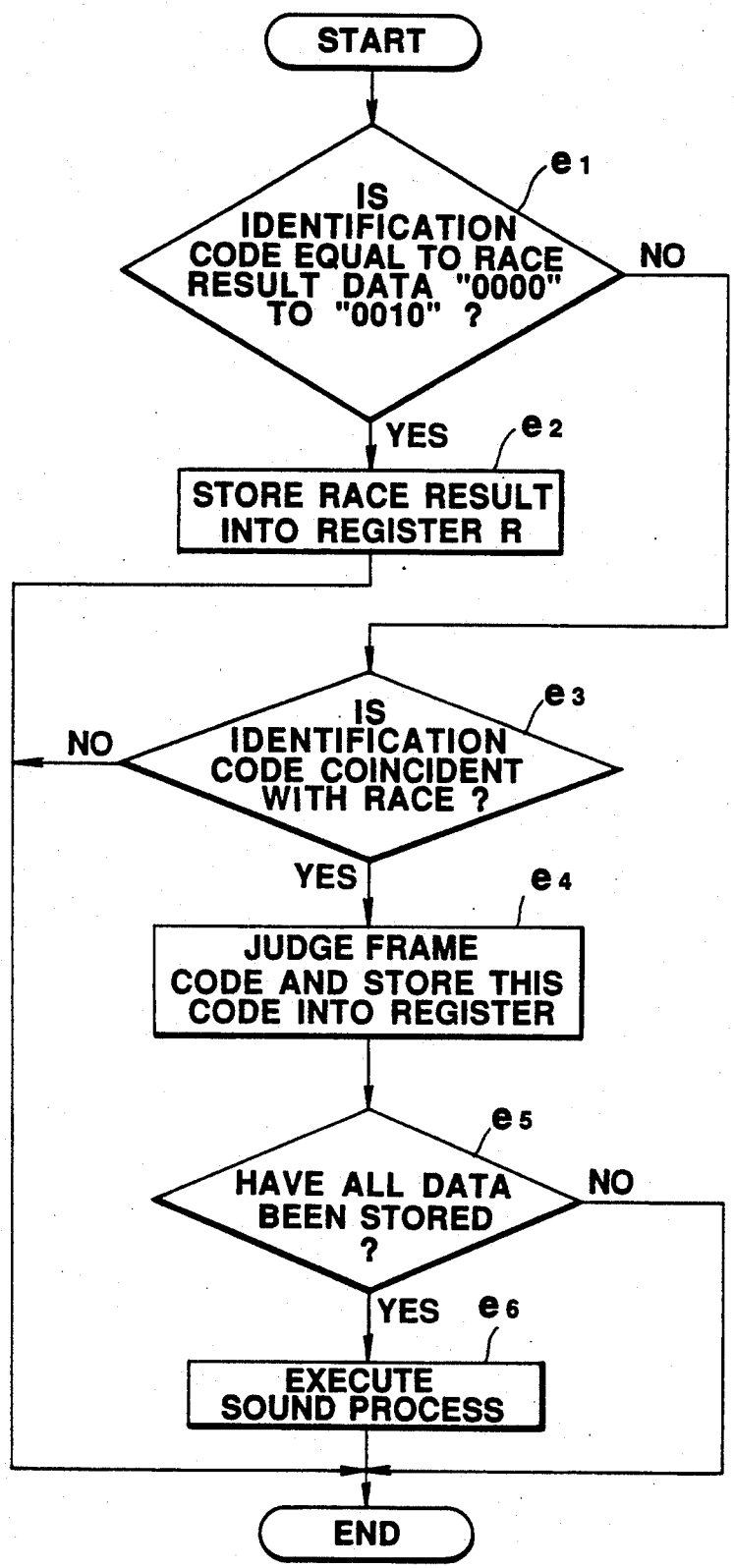
Figure 30:
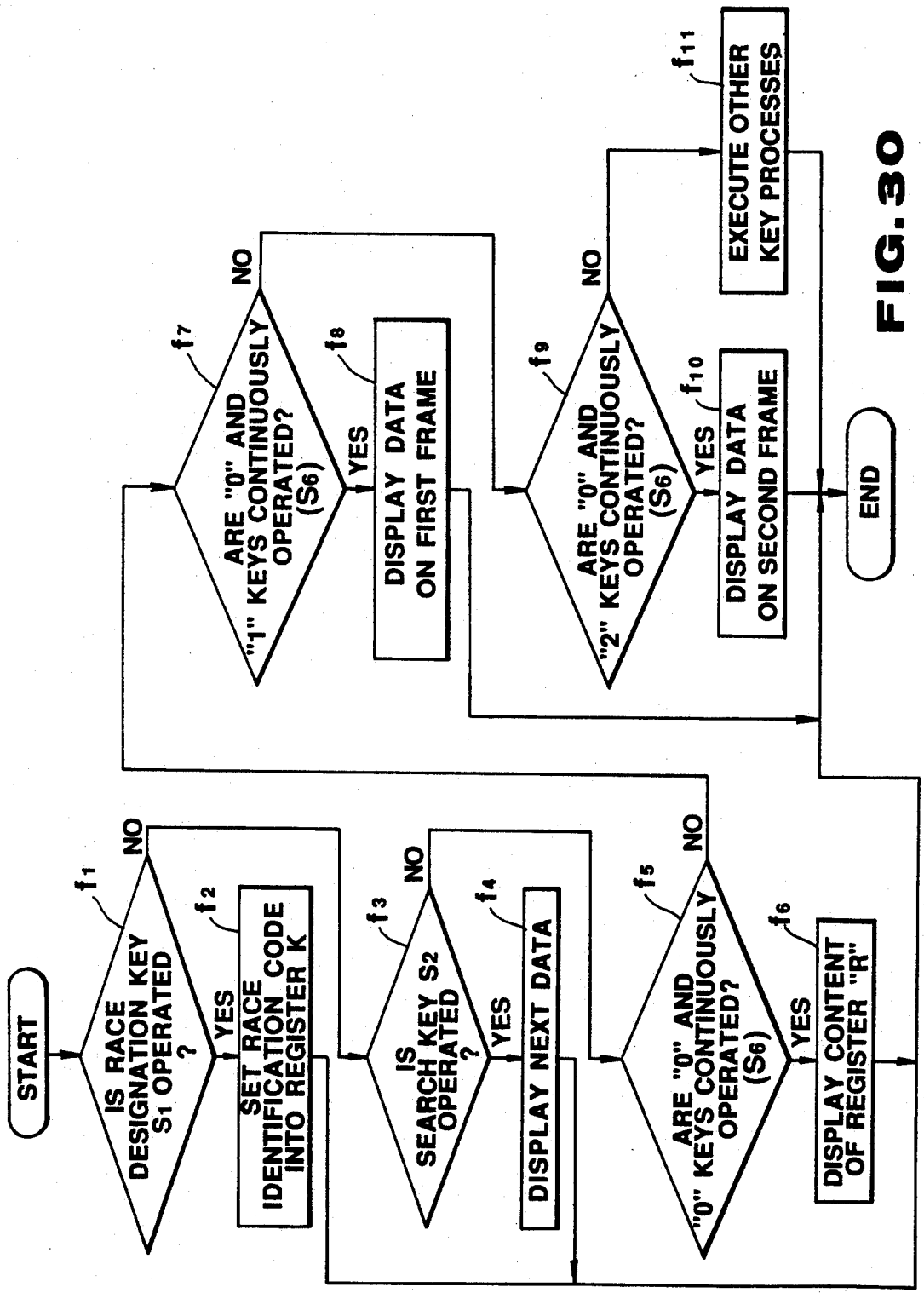
Figure 31:
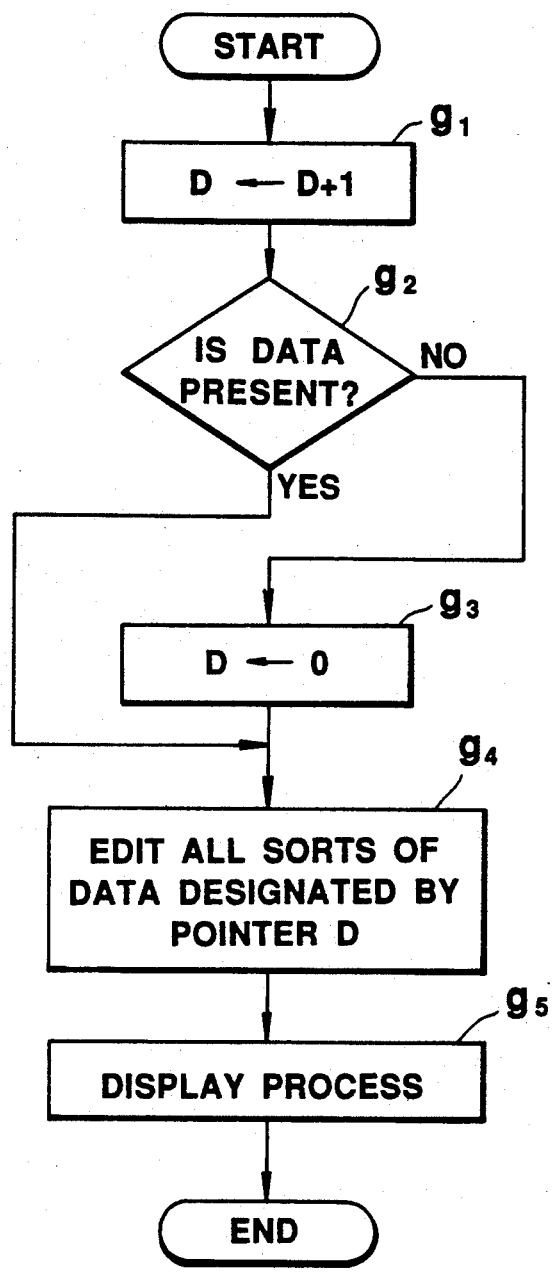

Referring now to flowcharts shown in FIGS. 29 to 32, typical processing operations according to the fourth radio receiver will be described. It should be noted that since the overall processing operation of the fourth preferred embodiment is the same as that of the third preferred embodiment shown in FIG. 21, no further explanation thereof is performed. FIG. 29 shows a flowchart for explaining a detailed operation of the received data fetch process defined in the step $a_{14}$ shown in FIG. 21. FIG. 30 represents a flowchart for explaining a detailed operation of the entire key process of the step $C_{15}$. FIG. 31 indicates a flowchart for explaining a key process when the data sort designating key $S_{17}$ is operated. In FIG. 32, there is shown the display conditions of the display unit 2 by operating the key.

The data fetch process defined in the flowchart shown in FIG. 29 will now be described in detail.

It should be noted that since processes defined in the following steps $e_1$ to $e_6$ shown in FIG. 29 are the same as the previous steps $b_{21}$ to $b_{26}$ shown in FIG. 23, except for the step $e_4$, only the process defined in the step $e_4$ will be described. In this step $e_4$, when the race identification code is coincident with the race in the previous step $e_3$, a check is made whether or not the frame code "i" (refer to $Z_1$ of FIG. 27) of the various data contained in the received data corresponds to the order of the frame. Then, the data are stored in the corresponding registers $Q_1, Q_2, Q_3$ —etc. which are determined by this judgement. In accordance with this process, when the data other than the race result data, for instance, the odds data, and horse weight data are received, only the data relating to the desirable race which has been designated by the race designation key $S_{11}$ is classified every frame and thereafter stored in RAM 35.

The detailed key process will now be described with reference to the flowchart shown in FIG. 30.

As processes defined in the following steps $f_1$ to $f_4$ shown in FIG. 30 are the same as the previous processes $C_{21}$ to $C_{24}$ shown in FIG. 23, an explanation will now be made to the subsequent step $f_5$. At the step $f_3$, if the operated key is not the search key $S_{12}$, the process is advanced to a step $f_5$. In this step $f_5$, a judgement is made whether or not a "0" key among the frame designating numeral key "$S_{16}$" is continuously operated. That is, a check is made whether or not the race result has been designated irrelevant to the frame designation. If the race result has been designated, the process is advanced to a step $f_6$. In this step $f_6$, both the race result data and dividend data which have been stored in the race result register "R" are read out so as to be displayed on the display unit 2. To the contrary, if the race result is not designated at the previous step $f_5$, another judgement is made whether or not both the "0" key and "1" key are successively and continuously operated among the frame designating numeral key $S_{16}$. In other words, a check is made whether or not the data on the first frame has been designated. In the subsequent step $f_8$, the various data on the first frame which have been stored in the first frame register $Q_1$ are read out therefrom so as to be displayed on the display unit 2. If, to the contrary, a judgement is made that the first frame data is not designated at the above step $f_7$, the process is advanced to a step $f_9$. In this step $f_9$, another check is made whether or not the "0" key and "2" key among the frame designating numeral key $S_{16}$ have been sequentially and continuously operated. That is, a check is done whether or not the data on the second frame has been designated. If the data on the second frame has been designated, then he process is advanced to a step $f_{10}$, the various data concerning the second frame which have been store in the second frame register $Q_2$ are read out so as to be displayed on the display unit 2. Conversely, if a check is made that the data on the second frame has not been designated, the process is advanced to a step $f_{11}$. At this step $f_{11}$, the key processes in accordance with other key operations are executed. That is to say, a judgement is made whether or not the data on other frames have been designated, the data on the respective frames are displayed, or the key processes other than the frame designation are performed.

In accordance with the processes defined in the above-described steps $f_5$ to $f_{11}$, either the race result data, or desirable frame data is designated by the frame designating numeral key $S_{16}$, so that the designated data can be selected from the various data which have been stored in RAM 35 every frame, for the display purpose. For instance, when the "0" key among the frame designating numeral key "$S_{16}$" is continuously operated two times, both the race result data (i.e., the either order forecast in this example) for the respective races, and also the dividend amount data can be displayed, as represented in the display example "a" of FIG. 32A. When the "0" key and "1" key among the frame designating numeral key "$S_{16}$" are successively and continuously operated, the various data relating to the first frame can be displayed within one time, as represented in FIG. 32c. Furthermore, when the search key $S_{12}$ is operated under such a condition that these data are displayed, the data on the next page can be displayed by executing the processes defined in the steps $f_3$ and $f_4$, as represented in FIG. 32A.

Referring now to a flowchart shown in FIG. 31, a process when the data sort designating key $S_{17}$ is specifically operated under the other key process defined in the step $f_{11}$, will be described in detail.

In the flowchart shown in FIG. 31, a sort designating pointer D is counted up by 1 at a step $g_1$, so that the next sort is designated from all of the sorts of the data. In the subsequent step $g_2$, a judgement is made whether or not the data on the designated sort has been stored in RAM 35. If no such a data has been stored, the sort designating pointer D is reset at a step $g_3$. If the data has been stored, the content of the sort designating pointer "D" remains. Then, at the next step $g_4$, all of the data having the sorts designated by the pointer "D" are read out from the respective registers of RAM 35, and edited. The resultant data are displayed on the display unit 2 with one time.

In accordance with the process defined in the steps $g_1$ to $g_5$, every time the data sort designating key $S_{17}$ is operated, all of the stored data as to a single sort are successively changed at the sort unit for the display purpose. For instance, in case that "the horse weight" is designated by the sort designating pointer "D" while operating the data sort designating key $S_{17}$, as represented in FIG. 32B, all of the horse weight data are displayed within one time.

As described above, the radio receiver according to the fourth preferred embodiment has the particular advantages similar to those of the third preferred embodiment. That is, there is no such problem that the data required for the user cannot be heard by a conventional receiver. In addition, the memory capacity of RAM 35 can be selected to be small, and also a compact radio receiver can be achieved. Moreover, since various desirable data on all of the horses can be displayed at one time, the user can predict the races very easily based upon the displayed various data.

It should be understood that the above-described receivers are lent by owner of the horse racing stadium, and the transmission signal sent from the horse racing can be received by all of these receivers without any restriction.

Fifth Radio Receiver

Similar to the second preferred embodiment, in the above-described third and fourth radio receivers, the message relating to the racing results may be independently transmitted outside the horse racing stadium in accordance with the contract with the present pager firm, and only persons who have made such a contract can receive the message. To this end, an ID-ROM 21 and address coincidence detecting circuit 22 may be provided between the BCH error correcting circuit 6 and S-P converting circuit 9 as shown in FIG. 14 in the fifth radio receiver. A format of the transmission signal is represented as in FIG. 33.

Figure 33:
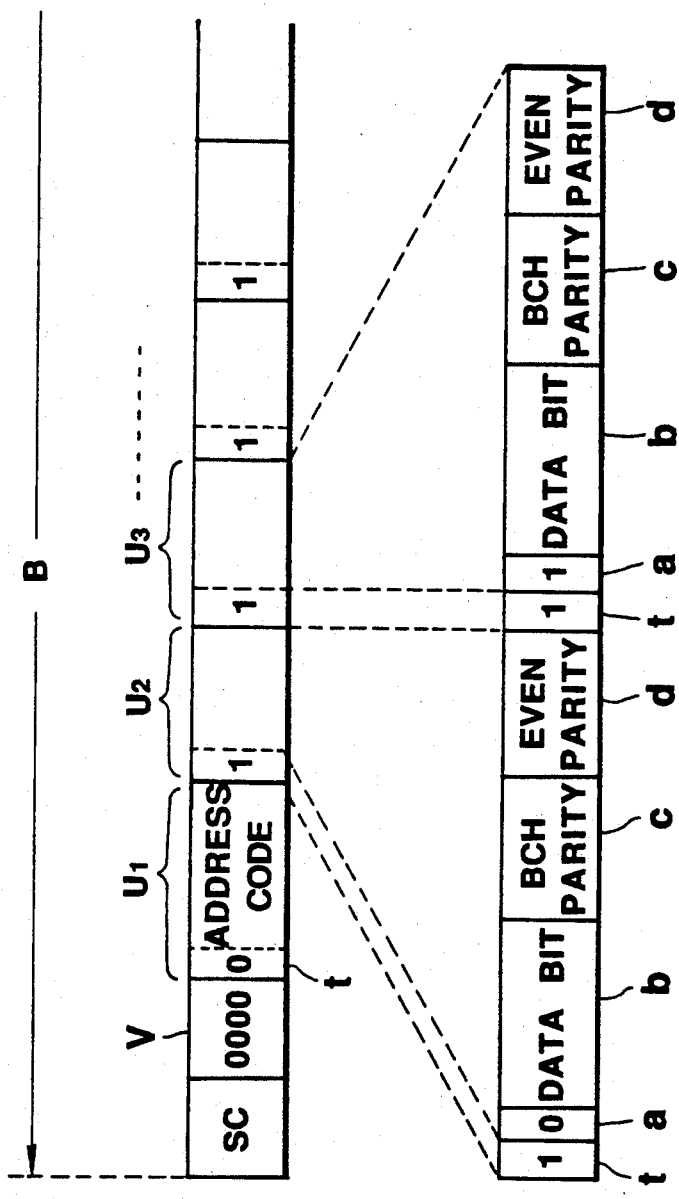
FIG. 33 is a format of a transmission signal employed in a radio receiver according to a fifth preferred embodiment of the present invention.

In the signal format shown in FIG. 33, a batch signal "B" is constructed of a synchronization code SC, a race identification code V, and a plurality of code words $U_1$, $U_2$, $U_3$, —. In each of the code words $U_1$, $U_2$, $U_3$, —, an identification flag "t" is positioned at a head thereof, and an address code and message data are positioned subsequently "0" is set to the identification flag "t" in case that data succeeded to this flag corresponds to the address code, whereas "1" is set to the identification flag "t" in case of the message data. The above-described address code corresponds to a self calling number. Similar to the message data, this address code is constructed of the racing result data and dividend data as shown in $Z_0$ of FIG. 18. In this example, data for a single race is arranged by two code words. It should be noted that the transmitting format of the message data other than the racing result data is to employ a data arrangement of "e" to "h" of $Z_1$ in FIG. 18, instead of the data arrangement of "a" to "d" in FIG. 33. By employing such a transmission format, only the message data which has been transmitted to the own receiver can be fetched so as to store and display various data similar to the previous preferred embodiments.

Sixth Radio Receiver

In the above-described third to fifth preferred embodiments, the data relating to the race stored in the memory employed in the radio receiver and only the desired data is selectively displayed by way of the switch operation. Accordingly, since there are large quantities of the sorts in the racing data, the capacity of the memory employed in the receiver must store all of these data so that the sizes of the radio receivers become large. Then, in accordance with the following preferred embodiment, the important data such as the actual racing result data are stored without any restriction among the various received data. Furthermore, other necessary data are stored in such a manner that the sorts of the data are preset and only the preset data are stored. These stored data are displayed so that the radio receiver can be made compact.

Front Panel of Sixth Radio Receiver

Figure 34:
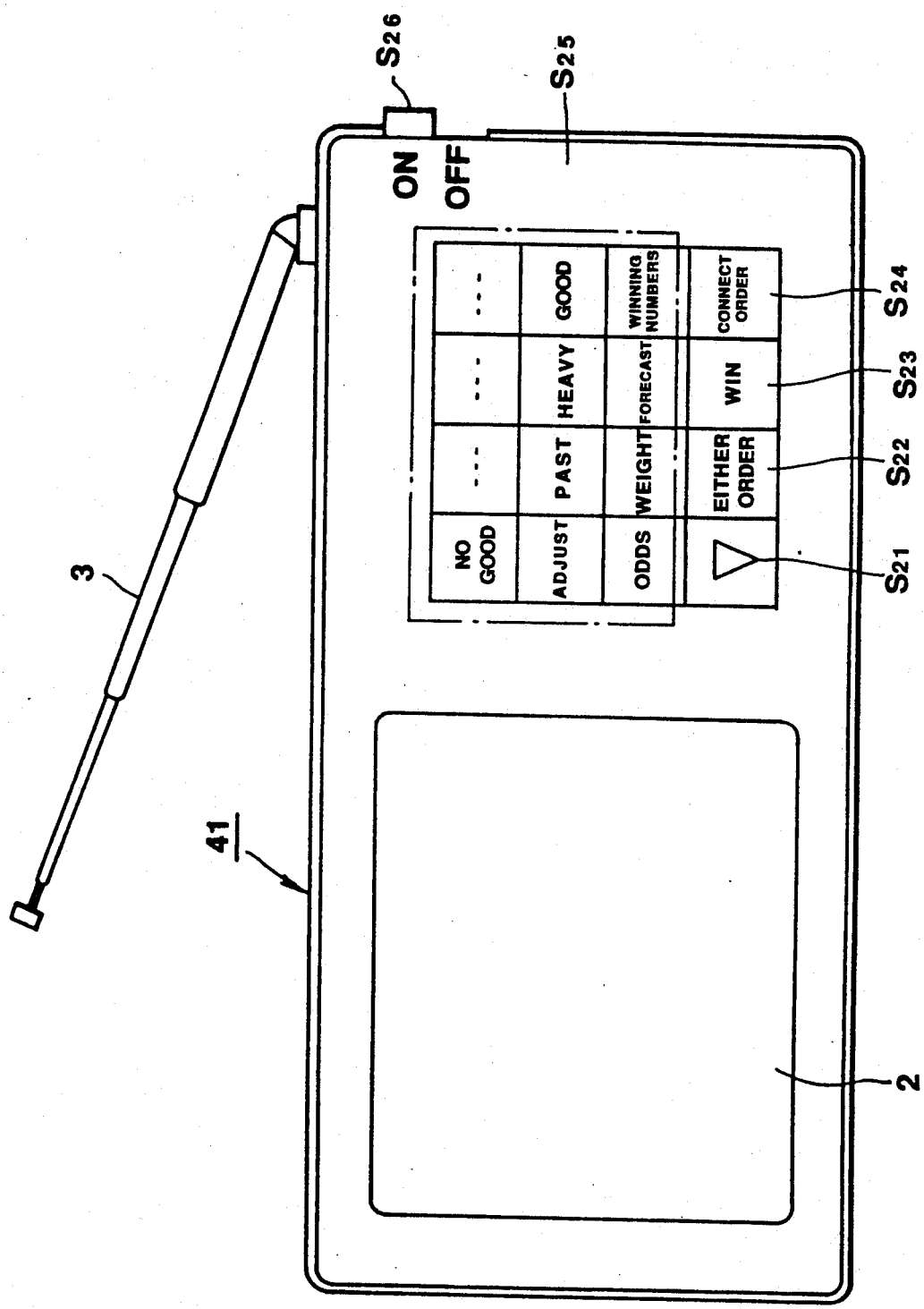

In FIG. 34, there is shown a front panel of the radio receiver body 41 according to the sixth radio receiver. Similar to the front panel shown in FIG. 26, at a left portion of the front panel, there is provided a display unit 2 constructed of a liquid crystal display apparatus capable displaying various data received by the sixth radio receiver. At a right portion of an upper surface unit of the receiver body 41, an antenna trimmer 3 is provided so as to received the electromagnet wave transmitted from the transmitter station. Various keys $S_{21}$ to $S_{25}$ are arranged at the right side of the receiver unit 2. The key $S_{21}$ is a search key for sequentially changing the sort of the data designated by the keys $S_{22}$ to $S_{25}$. The keys $S_{22}$, $S_{23}$, and $S_{24}$ are selection keys for designating and displaying the racing result data on the either order forecast, win and correct order forecast among the received data which have been stored in the memory. The key $S_{25}$ is a selection key for designating only one desirable sort of data from a plurality of sorts of the received data on the races. This selection key $S_{25}$ is constructed of, for instance, an odds key for designating odds data; a weight key for designating data on the horse weight; an adjustment key for designating data on the adjusting conditions; winning numbers key on races; and a past key for designating data on the past achievements. Also, above the side surface unit of the receiver body 41, a main switch $S_{25}$ is provided for turning ON/OFF the supply of the power to the circuit portion relating to only data reception relating to only data reception.

Circuit Arrangement and Code Format

Figure 35:
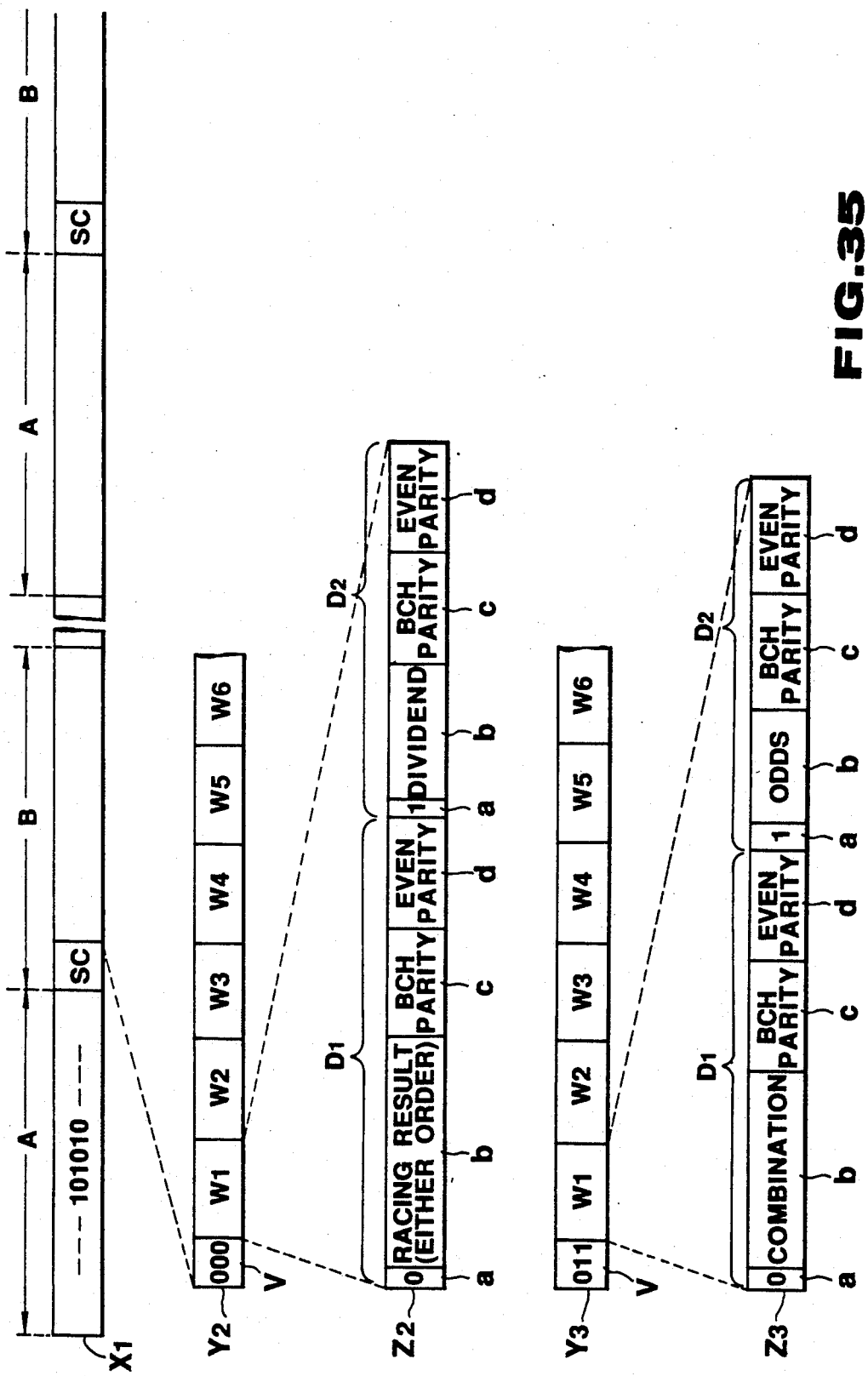

A circuit arrangement of the above-described receiver body 41 is the same as that of FIG. 17. A code format of a signal transmitted from a transmitter station is arranged as shown in FIG. 35. That is, as shown in "$X_1$" of FIG. 35, the code format of this transmission signal is constructed as follows. A preamble signal "A" constructed by repeating "1" and "0" is positioned at a head thereof, and subsequently a batch signal "B" is arranged. The function of this preamble signal is to cause the radio receiver to be perceivable that data will be transmitted from now on, and to establish an input synchronization. The batch signal "B" is constructed by a synchronization code "SC" positioned at a head portion thereof, a plurality of codes $W_1$, $W_2$, $W_3$, —containing various data relating to the races as represented by $Y_2$ and $Y_3$ of FIG. 35, and also a race identification code V for identifying which races correspond to these data.

Any of the above-described codes $W_1$, $W_2$, $W_3$, —is so arranged as shown in, for instance, "$Z_2$" and "$Z_3$" of FIG. 35. That is, the above codes are arranged by the code word $D_1$ representative of the race result data or the combined data, and another code word $D_2$ indicative of the dividend amount data and odds data corresponding to these data. Then, each of these two code words $D_1$ and $D_2$ is constructed of an identification flag "a", a data bit "b", a BCH parity "c" and an even parity "d". It should be noted that the identification flag "a" is set to "0" when the subsequent data bit "b" corresponds to the race result data combined data shown in the center column of FIG. 36, whereas the identification flag "a" is set to "1" when the next data bit "b" corresponds to the dividend amount data and odds data shown in the right column of FIG. 36. The function of the BCH parity "c" is a bit for correcting an error occurring within the code. The even parity "d" is a bit for representing that a total number of the bits indicative of "1" from the head bit to the last bit is equal to an odd number, or an even number. For instance, in case that there is one bit error between "1" and "0", a judgement can be done by checking this even parity whether or not the bit is dropped or added.

The above-described identification code V is constructed of a 3-bit signal corresponding to a sort of data contained in the codes $W_1$, $W_2$, $W_3$,—subsequent to this identification code. The identification code becomes such a code shown in the left column of FIG. 36, with respect to the data represented in the center column and right column of FIG. 36. For instance, the identification code V corresponding to the racing result data and dividend amount data thereof on the either order forecast shown in $Z_2$ of FIG. 35, becomes "000" as shown in $Y_2$ of FIG. 35. The identification code V corresponding to the combined data and odds data thereof as represented in $Z_3$ of FIG. 35 is indicated by "011" shown in $Y_3$ of FIG. 35.

Figure 37:
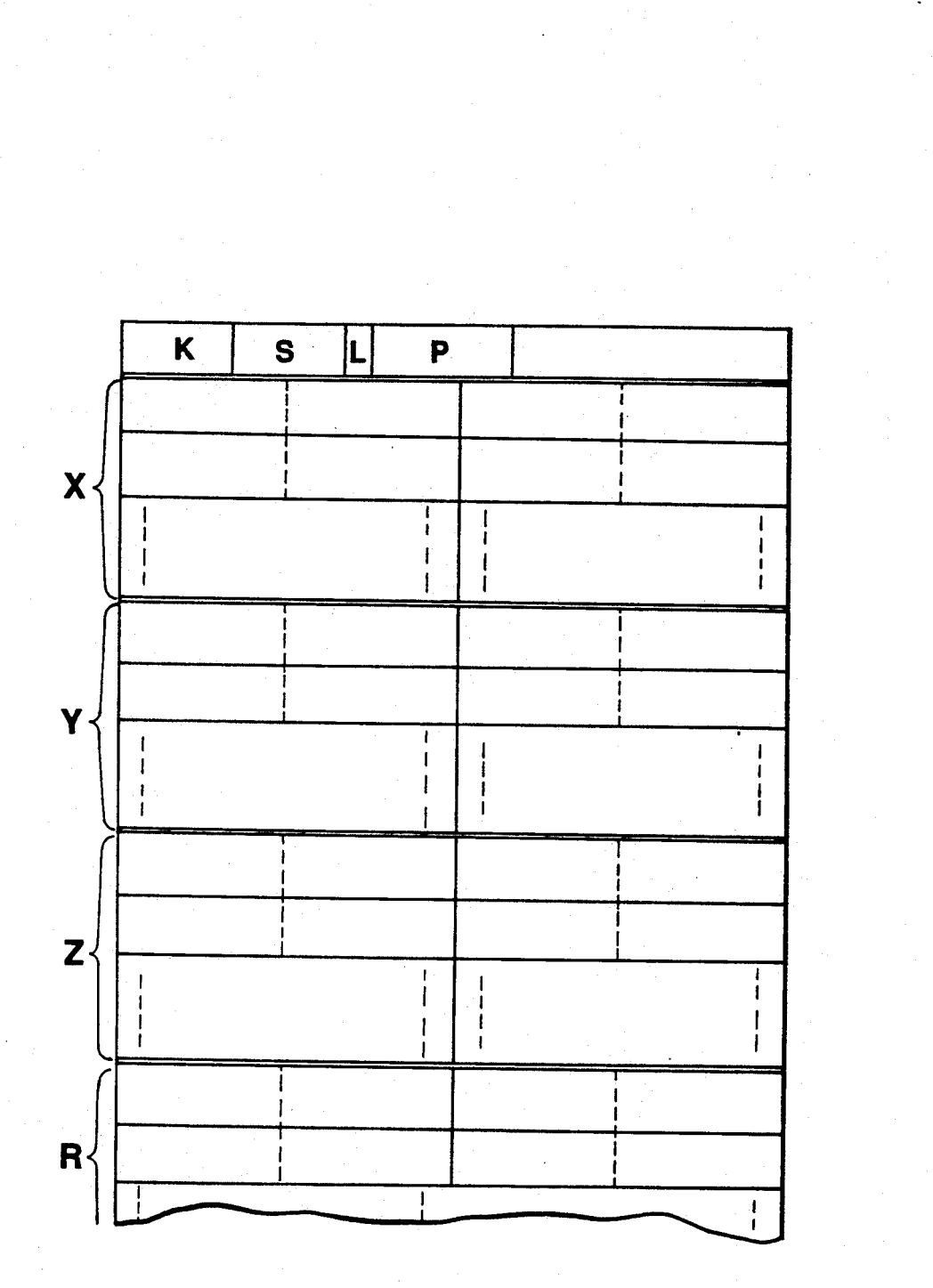

An arrangement of the memory employed in the fifth preferred embodiment, namely of the RAM 35 shown in FIG. 17 is represented in FIG. 37. In FIG. 37, registers X, Y, and Z are such registers for storing the racing result data and dividend data thereof on the either order forecast, win, and correct order forecast, respectively. Each of these racing result registers is arranged by a plurality of memory regions. A register "R" corresponds to a selected data register for storing only data, the sort of which has been selected by the selecting key $S_{25}$ shown in FIG. 34, and similarly is constructed of a plurality of memory regions.

An identification code register "K" is a register for storing identification codes (see FIG. 36) in accordance with the key operations of the selecting keys $S_{22}$ to $S_{25}$. A timer register "S" functions as, for example, a 10-second timer which outputs the above-described reception prohibit signal (refer to FIG. 17) for only 10 seconds when the key is operated. A reception accept/prohibit flag register "L" stores "1" when the key is operated, and "0" when the above-described timer register "S" is timed up. While "1" has been stored, the above-described reception prohibit signal is output so as to prohibit the data reception. A display pointer "P" designates data to be displayed on the display unit 2 among a plurality of data which have been stored in the respective memory regions of each of the registers X, Y and Z.

Major Operation of Fifth Radio Receiver

A major processing operation of the radio receiver according to the fifth preferred embodiment will now be described.

It should be noted that since the overall processing operation of the fifth preferred embodiment is the same as that shown in the flowchart of FIG. 21, no further explanation is made. In flowchart of FIG. 38, there is shown a received data fetch process defined at the step $a_{14}$ in FIG. 21. A key process defined at the step $a_{15}$, is explained in the flowchart shown in FIG. 39. FIGS. 40A and 40B illustrate diagrams for representing the display changes in the display unit 2 effected by the key operations.

Figure 38:
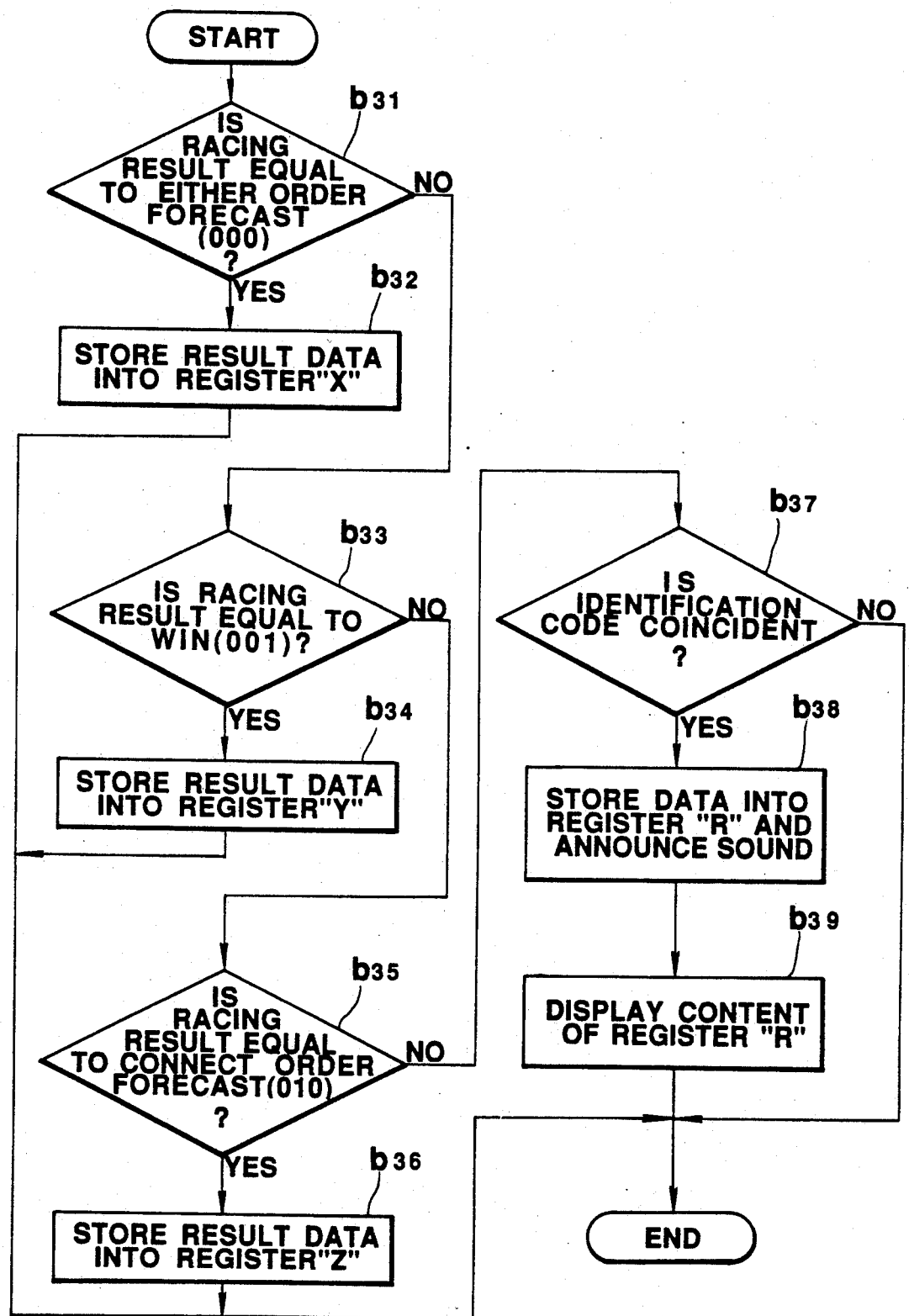

In a step $b_{31}$ of FIG. 38, a judgement is made whether or not the identification code "V" (refer to FIGS. 35 and 36) of the received data corresponds to "000". That is, a check is made whether or not the identification code V corresponds to the racing result data of the either order forecast. If the code V is equal to "000", then the process is advanced to a step $b_{32}$. At this step $b_{32}$, the received data is stored in the racing result register "X" for the either order forecst. To the contrary, if the code V is not equal to "000" at this step $b_{31}$, then another judgement is made whether or not the code V is equal to "001", namely to the racing result data for the win at a step $b_{33}$. If yes, then the received data is stored in the racing result register "Y" for the win of RAM 35 at a step $b_{34}$. If no in the step $b_{33}$, a check is made whether or not the code V is equal to "010", namely the racing result data of the correct order forecast at the subsequent step $b_{35}$. If the code V is equal to "010", then the received data is stored in the racing result register "Z" of the correct order forecast in RAM 35 at a step $b_{36}$.

In accordance with the processes defined in the steps "$b_1$" to "$b_6$", since the racing result data on the either order forecast, win, and correct order forecast are absolutely necessary, when these necessary data are received, these data are stored into RAM 35 without any restriction.

On the other hand, if the identification code V is not equal to "010", the process is advanced to a step $b_{37}$. At this step $b_{37}$, the identification code V of the received data is selected by the selection key $S_{25}$. Then, a judgement is made whether or not the selected identification code is coincident with another identification code stored in the identification code register "K". If there is a coincidence in these identification codes, the process is advanced to a step $b_{38}$. Thus, the received data is stored in the selected data register "R" of RAM 35, and also the energizing signal is supplied to the speaker driving circuit 21 shown in FIG. 17 so as to output a sound "pe" from the speaker 22. Subsequently, at a step $b_{39}$, the data stored in the selected data register "R" is displayed on the display unit 2.

In accordance with the processes defined in the steps $b_{37}$ to $b_{39}$, upon receipt of various sorts of such data as the odds data, horse weight data, race prediction data and past achievement data other than the above-described racing result data, only the selected sort of the data which are previously selected by operating any one of the selection keys $S_{25}$ represented in FIG. 34 are stored in RAM 35. Then, while the speaker outputs the sound, the selected sort of the data is displayed. For instance, under such a condition that the identification code "100" has been stored in the identification code register "K" by operating, for instance, the horse weight key among the selection key $S_{25}$, when both the horse name and horse weight data thereof are received, the sound "pe" is output from the speaker and the received data are displayed as represented in the display examples "c" through "d" of FIG. 40B. As a result, an operator can immediately become aware of the reception of the desirable data. It should be noted in the display example "d" that a numeral surrounded in the box indicates the horse racing number, the alphabetical indication beside the numeral represents the name of horse, and 3 digits of the number corresponding thereto represent the horse weight (unit:kg)

Figure 39:
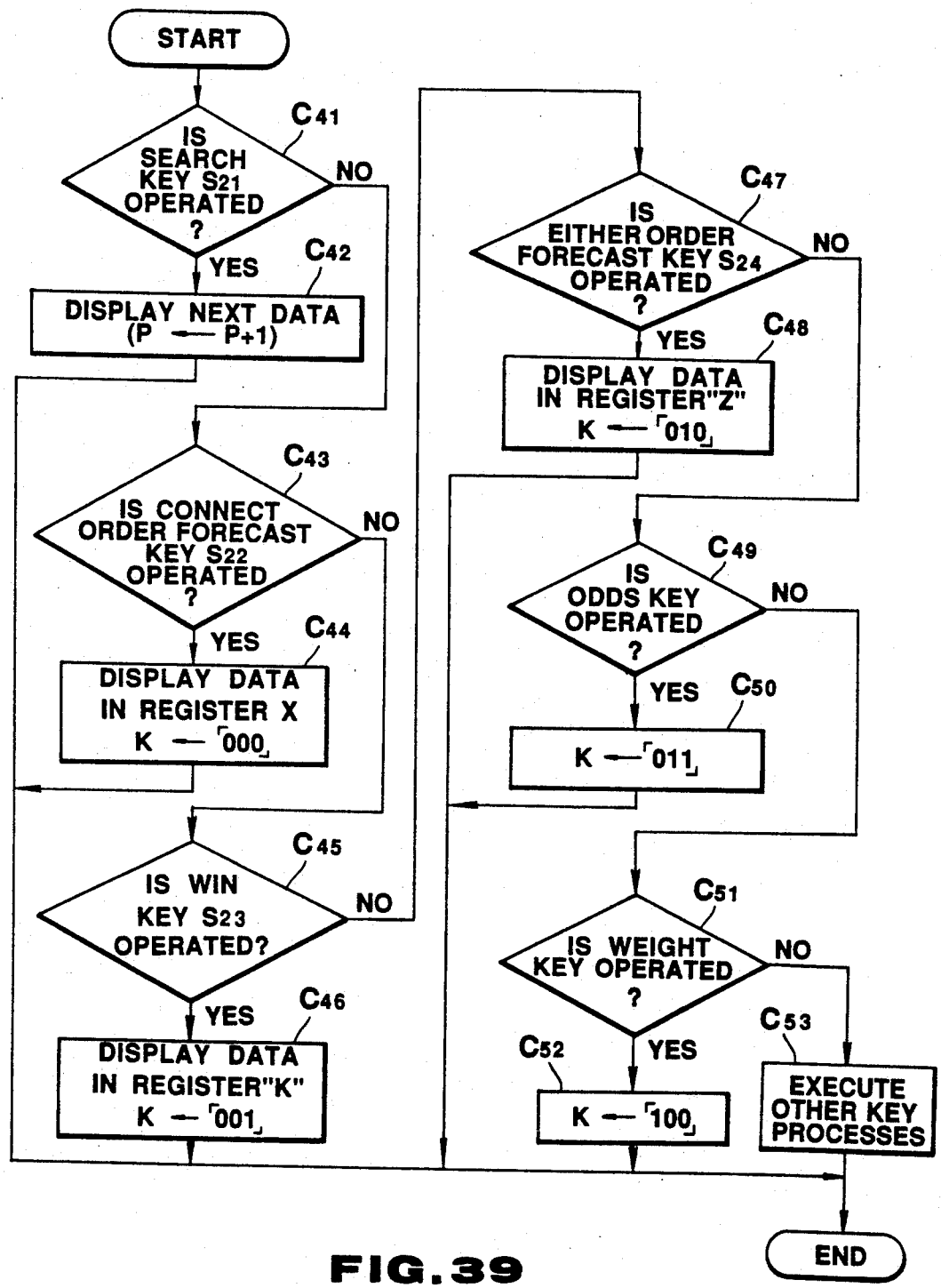
Figures 40A, 40B:
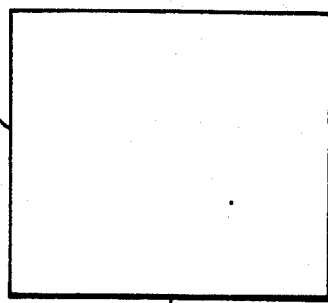

Referring now to a flowchart shown in FIG. 39, the key process is described in detail.

In the flowchart of FIG. 39, a judgement is made whether or not the operated key corresponds to the search key $S_{21}$ at a step $C_{21}$ at step $C_{41}$. If the search key $S_{21}$ is operated, the content of the display pointer "P" is counted up by "1" at the next step $C_{42}$. As a result, a designation is made to the data on the page subsequent to the data which has been designated by the display pointer "P", from the register corresponding to the identification code (refer to the following steps $C_{43}$ to $C_{53}$ among the four registers X, Y, Z and R for storing the received data.

When, on the other hand, a judgement is made that the search key $S_{21}$ is not operated, the process is advanced to a step $C_{43}$, at which another judgement is made whether or not the selection key $S_{22}$ for designating the racing result data on the either order forecast is operated. If yes, then the process is advaced to a step $C_{44}$. At this step $C_{44}$, both the racing result data and dividend data on the either order forecast which have been stored in the racing result register "X" are read out therefrom, and displayed on the display unit 2, and further "000" is set to the identification code register "K". In the above-described step $C_{43}$, if the selection key $S_{22}$ is not operated, the process is advanced to a step $C_{45}$. At this step $C_{45}$, a check is made whether or not the selection key $S_{23}$ for designating the racing result data on the win is operated. If the selection key $S_{23}$ is operated, then both the racing result data and dividend data on the win are read out from the racing result data register "Y", and "001" is set to the identification code register "K". At the step $C_{45}$, if a judgement is made that the selection key $S_{23}$ is not operated, the process is advanced to a step $C_{47}$. At this step $C_{47}$, a check is made whether or not a selection key $S_{24}$ for designating the racing result data on the correct order forecast is operated. If yes, then the key process is advanced to a step $C_{48}$. At this step $C_{48}$ both the racing result data and dividend data stored in the racing result data register "Z" are read out from this register so as to be displayed on the display unit 2, and also "010" is set to the identification code register K.

In accordance with the above-described processes defined in the steps $C_{43}$ to $C_{48}$, while the desired key is selected from the selection keys $S_{22}$, $S_{23}$, and $S_{24}$ for designating the either order forecast, win, and correct order forecast, and is operated, both the racing result data and dividend data corresponding to the operated key can be displayed. For instance, when the selection key $S_{22}$ is operated, as represented in the display example "a" of FIG. 40A, both the racing result data and dividend data on the either order forecast with respect to the respective races can be displayed. In this display example "a", for instance, "2R" denotes the second race; numerals "4-5" indicates the racing result of the either order forecast in the second race; numeral "850" beside the above numerals indicates the odds for the refound amount per 100 dollars. Under this condition, when the search key $S_{21}$ is operated, the next data can be displayed as shown in the display example "b" by the above-described process defined at the steps $C_{41}$ and $C_{42}$.

When a judgement is made that the selection key $S_{24}$ is not operated at the step $C_{47}$, a check is made whether or not the operated key corresponds to the odds key among the selection key $S_{25}$ at a step $C_{49}$. If yes, then the identification code "011" corresponding to the odds key is set to the identification code register "K". At this step $C_{49}$, if the odds key is not operated, subsequently a judgement is made whether or not the weight key among the selection key $S_{25}$ operated at a step $C_{51}$. If yes, then the identification code "100" corresponding to the weight key is set to the identification code register K at a step $C_{52}$. If a judgement is made that the weight key is not operated at the step $S_{51}$, another check is made whether or not other key among the selection key $S_{25}$ is operated at a step $C_{53}$, and also the identification code corresponding to this key is set to the identification code register "K".

In accordance with the above-described process defined in the steps $C_{49}$ to $C_{53}$, the desired key is selected from the selection key $S_{25}$ whereby the identification code corresponding to the operated key can be stored in the identification code register "K". While this key is operated, as shown in the representation example "c" of FIG. 40B, no representation is performed. Thereafter, when the sort of the data corresponding to the identification code which has been set in the code register "K" is received, as represented in the example "d", the received data is displayed. Under this representing condition, when the search key $S_{21}$ is operated, the subsequent data are sequentially changed and displayed (see the steps $C_{41}$ and $C_{42}$), which is similar to such a case that the above-described racing result data is processed.

As described above, according to the sixth preferred embodiment, the absolutely necessary data, i.e., racing result data among the sorts of the data can be stored without any restriction, which can be also immediately displayed by operating the key $S_{22}$, $S_{23}$ or $S_{24}$. Since only the sort of the data designated by the selection key $S_{25}$ as to the data other than the racing result data is stored, the small memory capacity of RAM 35 is available, which may make the radio receiver compact.

Similarly, in the radio receiver according to the sixth preferred embodiment, the message concerning the racing results may be independently transmitted with mading a contract with the present pager firm. In this case, the circuit arrangement of the radio receiver is similar to that of FIG. 14. The format of the transmission signal is similar to that of FIG. 33.

It should be noted that although horse racing was considered in the above-described preferred embodiments, the present invention may be applied to other forms of gambling such as dog racing, boat racing, and auto racing, lucky numbers, games, lotteries, baseball games, boxing matches, or other various forms of gambling.

What is claimed is:

1. A radio receiver comprising:
    input means for inputting a plurality of prediction data with respect to each of a plurality of races;
    memory means for storing said plurality of prediction data inputted by said input means;
    display means for displaying said plurality of prediction data stored in said memory means;
    receiving means for receiving result data about said plurality of races;
    coincidence judging means for judging whether or not result data for each of said plurality of races received by the receiving means is coincident with each of said plurality of prediction data stored in said memory means; and
    display control means for displaying the prediction data which is coincident with said result data on said display means in a display mode different from that of other prediction data.

2. A radio receiver as claimed in claim 1, wherein said receiving means includes error detecting means for detecting an error contained in the received data, and when data having a higher probability of the error is detected by the error detecting means, said display means clearly indicates the higher probability of the error.

3. A radio receiver as claimed in claim 1, wherein said input means includes key input means for inputting order data on a race as the prediction data.

4. A radio receiver as claimed in claim 1, wherein said input means includes key input means for inputting a lucky number of a lottery as the prediction data.

5. A radio receiver as claimed in claim 1, wherein said coincidence judging means includes announcing means for announcing said coincidence between the result data and prediction data by way of a sound.

6. A radio receiver as claimed in claim 1, wherein said receiving means includes:
   a memory for storing an address number, and
   means for causing said coincidence judging means to be operated when said receiving means receives address number data that is identical to said address number stored in said memory.

7. A radio receiver as claimed in claim 1, further comprising:
   result data memory means for storing a plurality of result data received by said receiving means.

8. A radio receiver as claimed in claim 1, wherein said receiving means includes:
   error detecting means for detecting an error contained in the result data received by said receiving means, and
   announcing means for announcing the error detecting by said error detecting means.

9. A radio receiver comprising:
   input means for inputting a plurality of prediction data on a single race, and for inputting bet fee data representative of bet fees with respect to said plurality of prediction data;
   memory means for storing the plurality of prediction data and the bet fee data which is input by the input means;
   receiving means for receiving result data indicative of a race result and a payout amount or result data representative of an odds rate corresponding to the race result;
   coincidence judging means for judging a coincidence between the result data received by the receiving means, and each of the plurality of prediction data stored in the memory means;
   calculating means for calculating a refund payout of money based upon said bet fee data, payout rate data, or odds rate data, when a judgement is made by the coincidence judging means on the coincidence between the prediction data and result data on the race; and
   display means for displaying the payout amount of money calculated by the calculating means.

10. A radio receiver as claimed in claim 9, wherein said receiving means includes error detecting means for detecting an error contained in the received data, and fetches the received data so as to display the received data on the display means only when a judgement is made by the error detecting means that no error is contained in the received data.

11. A radio receiver as claimed in claim 9, wherein said receiving means includes detecting means for detecting an error contained in the received data, and when data having a higher probability of the error is detected by the error detecting means, said display means clearly indicates the higher probability of the error.

12. A radio receiver as claimed in claim 9, wherein said receiving means outputs a reception end signal every time said result data has been received, whereby both said coincidence judging means and calculating means are operated.

13. A radio receiver as, claimed in claim 9, wherein when key input is input by the input means, a process to be effected by the key input operation is executed prior to other processes.

14. A radio receiver as claimed in claim 9, wherein said input means includes key input means for inputting order data on a race as the prediction data.

15. A radio receiver as claimed in claim 9, wherein said input means includes key input means for inputting a lucky number of a lottery as the prediction data.

16. A radio receiver as claimed in claim 9, further comprising:
   display means for optically displaying the result data received by the receiving means.

17. A radio receiver as claimed in claim 9, where in said receiving means includes:
   a memory for storing an address number, and
   means for causing said coincidence judging means to be operated when address number data identical to said address number stored in the memory is received.

18. A radio receiver as claimed in claim 9, further comprising:
   result data memory means for storing a plurality of result data received by said receiving means.

19. A radio receiver comprising
   selection switch means for selecting a desired type of data from a plurality of types of data on a race;
   data type memory means for storing types of data indicative of the desired type selected by the selection switch means;
   receiving means for selectively receiving both said plurality of types of data concerning said race and race result data;
   judging means for judging whether or not the data selectively received by the receiving means corresponds to one of said type of data and said race result data;
   first received data memory means for storing said selectively received result data when a judgement is made by said judging means that the received data corresponds to result data indicative of the result of the race;
   second received data memory means for storing the selectively received type data when a judgement is made by said judging means that the received data corresponds tot he same type of data which has been stored in said sort data memory means; and
   display means for displaying the data stored in said first and second received data memory means.

20. A radio receiver as claimed in claim 19, wherein said display means displays the data which has been stored in the second received data memory means in a normal condition, and displays the data which has been stored in the first received data memory means when a predetermined switch is operated.

21. A radio receiver as claimed in claim 19, wherein said receiving means includes:

a memory for storing an address number, and means for causing said coincidence judging means to be operated when address number data identical to said address number stored in the memory is received.

22. A radio receiver as claimed in claim 19, wherein said first received data memory means includes:

result data memory means for storing a plurality of result data received by said receiving means.

23. A radio receiver as claimed in claim 19, wherein said receiving means includes:

error detecting means for detecting an error contained in the result data received by said receiving means; and announcing means for announcing the error detection made by said error detecting means.

24. A radio receiver comprising:

race designating means for designating a desired race among a plurality of races;

receiving means for receiving various data on the designated desired race;

memory means for storing a plurality of types of data on the desired race designated by said race designating means among the data received by the receiving means;

switch means for selecting and designating the desired type of data among said plurality of types of data relating to the desired race which have been stored in the memory means; and display means for displaying the type of data selected and designated by said switch means among the data stored in the memory means.

25. A radio receiver as claimed in claim 24, wherein said receiving means further includes:

result data receiving means for receiving the result data of said race; and result data memory means for storing the result data.

26. A radio receiver as claimed in claim 25, further comprising:

result data display means for optically displaying the result data stored in said result data memory means.

27. A radio receiver as claimed in claim 24, wherein said receiving means includes:

a memory for storing an address number, and means for causing said memory means to store the plurality of types of data when said receiving means receives address number data that is identical to said address number stored in said memory.

28. A radio receiver comprising:

race designating means for designating a desired race among a plurality of races in which a plurality of racers compete with each other;

receiving means for receiving various data relating to the racers;

memory means for storing various data concerning said desired race among the data received by said receiving means, which has been designated by said race designating means;

racer designating means for designating a desired racer among said plurality of racers for the desired race designated by said race designating means;

editing means for fetching data on the racer designated by said racer designating means from the various data which have been stored in the memory means, so as to edit the data on the racer: and display means for displaying the data which has been edited by the editing means.

29. A radio receiver as claimed in claim 28, wherein said receiving means further includes:

result data memory means for receiving the result data on said race and for storing the received result data.

30. A radio receiver as claimed in claim 29, further comprising:

display means for optically displaying the result data stored in said result data memory means.

31. A radio receiver as claimed in claim 28, wherein said receiving means includes:

a memory for storing an address number, and means for causing said memory means to store the data when said receiving means receives address number data that is identical to said address number stored in said memory.

32. A radio receiver comprising:

race designating means for designating a desired race among a plurality of races in which a plurality of racers compete with each other;

receiving means for receiving various data relating to the racers;

memory means for storing various data concerning said desired race among the data received by said receiving means, which has been designated by said race designating means;

data sort designating means for designating a desired sort of data among the various data on the desired races which have been stored in the memory means;

edit means for fetching only the sort of the data designated by said data sort designating means so as to edit the fetched sort of the data; and display means for displaying data which has been edited by the editing means.

33. A radio receiver as claimed in claim 32, wherein said receiving means further includes:

result data memory means for receiving the result data on said race and for storing the received result data.

34. A radio receiver as claimed in claim 33, further comprising:

display means for optically displaying the result data stored in said result data memory means.

35. A radio receiver as claimed in claim 32, wherein said receiving means includes:

a memory for storing an address number, and means for causing said memory mean to store the data when address number data identical to said address number stored in the memory is received.

* * * * *

UNITED STATES PATENT AND TRADEMARK OFFICE
CERTIFICATE OF CORRECTION

PATENT NO. : 5,212,636
DATED : May 18, 1993
INVENTOR(S) : Nakazawa

It is certified that error appears in the above-indentified patent and that said Letters Patent is hereby corrected as shown below:

Title page, Item [56] References Cited, under "U.S. PATENT DOCUMENTS",

"4,692,864" should be --4,692,863--

Signed and Sealed this

Twentieth Day of May, 1997

Attest:

BRUCE LEHMAN

Attesting Officer

Commissioner of Patents and Trademarks